US011089319B2

(12) United States Patent
Yang et al.

(10) Patent No.: US 11,089,319 B2
(45) Date of Patent: Aug. 10, 2021

(54) VIDEO ENCODING AND DECODING METHOD, APPARATUS AND SYSTEM

(71) Applicant: HUAWEI TECHNOLOGIES CO., LTD., Guangdong (CN)

(72) Inventors: Xiaofeng Yang, Shenzhen (CN); Yuanyuan Zhang, Nanjing (CN); Teng Shi, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 14/631,658

(22) Filed: Feb. 25, 2015

(65) Prior Publication Data

US 2015/0172693 A1   Jun. 18, 2015

Related U.S. Application Data

(63) Continuation of application No. PCT/CN2012/082494, filed on Sep. 29, 2012.

(51) Int. Cl.
*H04N 19/30* (2014.01)
*H04N 19/187* (2014.01)
(Continued)

(52) U.S. Cl.
CPC ......... *H04N 19/463* (2014.11); *H04N 19/119* (2014.11); *H04N 19/162* (2014.11);
(Continued)

(58) Field of Classification Search
CPC .. H04N 19/463; H04N 19/119; H04N 19/162; H04N 19/167; H04N 19/172;
(Continued)

(56) References Cited

U.S. PATENT DOCUMENTS 9,596,447 B2 * 3/2017 Chen .................... H04N 19/597
2005/0052294 A1   3/2005 Liang et al.
(Continued)

FOREIGN PATENT DOCUMENTS

CN    1965321 A     5/2007
CN    101075462 A   11/2007
(Continued)

OTHER PUBLICATIONS

Ye-Kui Wang et al., Tile groups, Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, JCTVC-H0520r1, total 10 pages.
(Continued)

*Primary Examiner* — Patrick E Demosky
(74) *Attorney, Agent, or Firm* — Leydig. Voit & Mayer, Ltd.

(57) ABSTRACT

The present invention discloses a video encoding and decoding method, apparatus and system, where the video encoding method includes: determining an independently decodable view in a to-be-encoded picture according to a configuration file corresponding to the video; dividing the picture into at least two tiles, where an area corresponding to one or more tiles that cover the independently decodable view is an independently decodable area; generating an auxiliary message corresponding to the picture, where the auxiliary message includes a location identifier of the independently decodable area; and encoding all tiles included in the picture to form an encoded video bitstream, where the encoded video bitstream includes the auxiliary message. Decoding this encoded video bitstream can lower a requirement for performance of a decoder and improve decoding efficiency.

10 Claims, 14 Drawing Sheets

(51) Int. Cl.
*H04N 19/463* (2014.01)
*H04N 19/162* (2014.01)
*H04N 19/119* (2014.01)
*H04N 19/597* (2014.01)
*H04N 19/17* (2014.01)
*H04N 19/70* (2014.01)
*H04N 19/172* (2014.01)
*H04N 19/167* (2014.01)
*H04N 19/176* (2014.01)
*H04N 19/16* (2014.01)

(52) U.S. Cl.
CPC ........... *H04N 19/167* (2014.11); *H04N 19/17* (2014.11); *H04N 19/172* (2014.11); *H04N 19/176* (2014.11); *H04N 19/597* (2014.11); *H04N 19/70* (2014.11); *H04N 19/16* (2014.11)

(58) Field of Classification Search
CPC ........ H04N 19/176; H04N 19/70; H04N 7/32; H04N 19/187; H04N 19/30
See application file for complete search history.

(56) References Cited

U.S. PATENT DOCUMENTS

| | | | |
|---|---|---|---|
| 2007/0269187 A1 | 11/2007 | Morimoto et al. | |
| 2007/0280346 A1* | 12/2007 | Tu | H04N 7/24 375/240 |
| 2009/0016622 A1* | 1/2009 | Itakura | H04N 21/2662 382/236 |
| 2011/0243222 A1 | 10/2011 | Choi et al. | |
| 2011/0286533 A1 | 11/2011 | Fortney et al. | |
| 2012/0082240 A1 | 4/2012 | Takada et al. | |
| 2012/0121015 A1 | 5/2012 | Yang | |
| 2012/0170648 A1* | 7/2012 | Chen | H04N 19/70 375/240.03 |
| 2012/0224634 A1 | 9/2012 | Yamori | |
| 2012/0224642 A1 | 9/2012 | Sines et al. | |
| 2013/0016786 A1* | 1/2013 | Segall | H04N 19/70 375/240.16 |
| 2013/0039593 A1* | 2/2013 | Komiya | H04N 19/46 382/233 |
| 2013/0188709 A1* | 7/2013 | Deshpande | H04N 19/70 375/240.13 |
| 2014/0003489 A1* | 1/2014 | Hannuksela | H04N 19/70 375/240.02 |
| 2014/0079126 A1* | 3/2014 | Ye | H04N 19/105 375/240.16 |
| 2015/0043633 A1 | 2/2015 | Regunathan et al. | |
| 2015/0281669 A1* | 10/2015 | Arena | H04N 19/597 375/240.24 |

FOREIGN PATENT DOCUMENTS

| | | |
|---|---|---|
| CN | 101583029 A | 11/2009 |
| CN | 102334097 A | 1/2012 |
| CN | 102461173 A | 5/2012 |
| CN | 102165776 B | 11/2012 |
| CN | 102959501 A | 3/2013 |
| EP | 2283655 A2 | 2/2011 |

OTHER PUBLICATIONS

Ohji Nakagami, Teruhiko Suzuki, Bitstream restriction flag to enable tile split, Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, JCTVC-I0056, total 4 pages.

Ohji Nakagami, Teruhiko Suzuki, Frame packing arrangement SEI extension for HEVC, Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, JCTVC-I0057, total 6 pages.

Ohji Nakagami, Teruhiko Suzuki, 2D compatible frame packing arrangement SEI, Joint Collaborative Team on Video Coding (JCT-VC) of ITU-T SG 16 WP 3 and ISO/IEC JTC 1/SC 29/WG 11 10th Meeting: Stockholm, SE, Jul. 11-20, 2012, JCTVC-J0070, total 9 pages.

Xiaofeng Yang et al., 2D compatible frame packing stereo 3D video, Joint Collaborative Team on Video Coding (JCT-VC) of ITU-T SG 16 WP 3 and ISO/IEC JTC 1/SC 29/WG 11 11th Meeting: Shanghai, CN, Oct. 10-19, 2012, JCTVC-K0116r1, total 3 pages.

Ye-Kui Wang et al., "Tile groups", Joint Collaborative Team on Video Coding (JCV-TC) of ITU-T SG16 WP3 and ISO/IEC JTC1/SC29/WG11, JCVTC-G0520. Feb. 1-10, 2012. total 10 pages.

XP030018858, ISO/IEC IS 14496-10:201X(E) (7th edition), Information Technology—Coding of Audio-Visual Objects—Part 10: Advanced Video Coding, Feb. 2, 2012. total 721 pages.

XP030005615, Hannuksela, M. et al., "Slice Group Related SEI Messages", Joint Video Team (JVT) of ISO/IEC MPEG & ITU-T SG16 Q.6), JVT-F045, 6th Meeting: Awaji Island, Dec. 5-13, 2002. total 8 pages.

XP030050443, Wang, Y-K., et al., "Tile groups", Joint Collaborative Team on Video Coding (JCT-VC) of ITU-T SG16 WP3 and ISO/IEC JTC1/SC29/WG11, JCTVC-G318, 7th Meeting: Geneva, CH, Nov. 21-23, 2011. total 10 pages.

XP030112432, Nakagami, O. et al., "2D compatible frame packing arrangement SEI", Joint Collaborative Team on Video Coding (JCT-VC) of ITU-T SG16 WP3 and ISO/IEC JTC1/SC29/WG11, JCTVC-J0070, 10th Meeting, Stockholm, SE, Jul. 11-20, 2012. total 8 pages.

* cited by examiner

VIDEO ENCODING AND DECODING METHOD, APPARATUS AND SYSTEM

CROSS-REFERENCE TO RELATED APPLICATIONS

This application is a continuation of International Application No. PCT/CN2012/082494, filed on Sep. 29, 2012, which is hereby incorporated by reference in its entirety.

TECHNICAL FIELD

The present invention relates to image processing technologies, and in particular, to a video encoding and decoding method, apparatus and system.

BACKGROUND

3DTV (Three-Dimensional Television, three-dimensional television) is a most common three-dimensional television technology. Using the technology, two independent views, a left one and a right one, are displayed on one screen, and the left eye and the right eye separately receive different views, so as to achieve a 3D three-dimensional effect. At present, when a service provider provides a 3DTV service, it is expected that an encoding tool and a transmission device that are of an original 2DTV (Two-Dimensional Television, two-dimensional television) are used as much as possible to reduce video production costs and transmission device costs.

To satisfy the foregoing requirement, a frame packing (frame packing) 3DTV technology is used to pack a left view and a right view into one frame of image, and then a 2D encoder and a 2D transmission device are used to perform encoding and transmission; a message about how to pack the two views is added to an encoded bitstream, or a message that directly indicates separate location information of the two views in the frame is added, and after a decoder performs decoding, the two views are output according to the foregoing message.

There is a plurality of packing types for views that use the frame packing 3DTV technology. FIG. 1 exemplarily shows two packing types, namely, a left-right type and a top-bottom type. For one packing type, there may also be different packing cases according to different flipping types. The flipping type indicates whether an arrangement order of a left-right view is flipped or an arrangement data of a top-bottom view is flipped. FIG. 1 shows different images formed by using different packing types and flipping types.

All existing decoders of various different types include two main parts: a decoding module and a local memory. The local memory is used to store a picture that is encoded but is not decoded and a decoded picture, where the decoded picture needs to be used as a reference frame for decoding a subsequent picture or outputting time of the decoded picture is not reached. The decoder needs to allocate enough storage resources to the local memory, and the decoding module needs to consume calculation resources of the decoder.

A video that needs to be transmitted forms a bitstream after being encoded, and profile (profile) information and level (level) information of each bitstream are transmitted in each bitstream. A profile indicates coding tools used by an encoder during video encoding (for example, in a main profile, a bit depth of a pixel is only 8 bits, a picture parameter set identifier PPS id cannot exceed 63, and tile coding is not enabled; however, all of these constraints do not exist in a high profile), and if the decoder does not support one of the coding tools thereof, decoding cannot be performed. A level indicates a calculation capability and a storage resource that are required when the decoder performs decoding. For example, a current hevc draft defines level 4 and level 4.1, where the level 4 and the level 4.1 respectively indicate that a decoder conforming to the two standards can reach 32 frame/s and 64 frame/s when a high definition bitstream whose resolution is 1920*1080 is decoded, but a decoder that conforms only to a standard below the level 4 cannot decode the high definition bitstream whose resolution is 1920*1080.

In a practical application, if the decoder receives a 3D video bitstream encoded by using the frame packing 3DTV technology, but the decoder is connected to a 2D display device, then after a picture is decoded by the decoder, only one of two views is obtained and then output to the 2D display device, as shown in FIG. 2. When solutions in the prior art are adopted, a higher-level decoder is required to perform decoding on the 3D video bitstream and then output the decoded picture to the 2D display device, because a Profile and Level requirement for encoding or decoding a 3D video bitstream is relatively higher than a Profile and Level requirement for encoding or decoding a 2D video bitstream. In addition, concerning the 2D display device, calculation and storage resources of the decoder are wasted because a picture that does not need to be displayed by the 2D display device also needs to be decoded.

SUMMARY

In view of this, to resolve the foregoing problem of wasting calculation and storage resources of a decoder or an encoder, the following technical solutions are used in implementation manners of the present invention.

A video encoding method, where a video includes a picture sequence and the method includes:

determining an independently decodable view in a to-be-encoded picture according to a configuration file corresponding to the video;

dividing the picture into at least two tiles (tile), where an area corresponding to one or more tiles that cover the independently decodable view is an independently decodable area;

generating an auxiliary message corresponding to the picture, where the auxiliary message includes a location identifier of the independently decodable area, and the location identifier of the independently decodable area includes one or more tile identifiers (tile id); and encoding all tiles included in the picture to form an encoded video bitstream, where the encoded video bitstream includes the auxiliary message.

A video decoding method, including:

receiving a video bitstream, where the video bitstream includes a to-be-decoded video and an auxiliary message, and the to-be-decoded video includes a to-be-decoded picture sequence;

acquiring a to-be-decoded picture;

obtaining a location identifier of an independently decodable area of the to-be-decoded picture according to the auxiliary message, where the location identifier of the independently decodable area includes tile identifiers (tile id) of one or more tiles (tile); and obtaining the independently decodable area of the to-be-decoded picture according to the location identifier of the independently decodable area, and decoding the independently decodable area.

A video encoder, where a video includes a picture sequence, including:

an independently decodable view determining unit, configured to determine an independently decodable view in a to-be-encoded picture according to a configuration file corresponding to the video;

a tile dividing unit, configured to divide the picture into at least two tiles (tile), where an area corresponding to one or more tiles that cover the independently decodable view is an independently decodable area;

an auxiliary message generating unit, configured to generate an auxiliary message corresponding to the picture, where the auxiliary message includes a location identifier of the independently decodable area, and the location identifier of the independently decodable area includes one or more tile identifiers (tile id); and an encoding executing unit, configured to encode all tiles included in the picture to form an encoded video bitstream, where the encoded video bitstream includes the auxiliary message.

Optionally, the encoding executing unit further includes: a determining unit, configured to: determine whether a current to-be-encoded tile is a tile in the independently decodable area; if yes, set an independently decodable area of an encoded picture to be a candidate inter-frame reference area of the current tile; if no, set a whole picture area of the encoded picture to be the candidate inter-frame reference area of the current tile; and when an inter-frame algorithm is used for encoding, select an optimal reference area according to the foregoing candidate inter-frame reference area corresponding to the to-be-encoded tile.

A video decoder, including:

a receiving unit, configured to receive a video bitstream, where the video bitstream includes a to-be-decoded video and an auxiliary message, and the to-be-decoded video includes a to-be-decoded picture sequence; and a decoding executing unit, configured to: acquire a to-be-decoded picture; obtain a location identifier of an independently decodable area of the to-be-decoded picture according to the auxiliary message, where the location identifier of the independently decodable area includes tile identifiers (tile id) of one or more tiles (tile); and obtain the independently decodable area of the to-be-decoded picture according to the location identifier of the independently decodable area, and decode the independently decodable area.

An encoder, configured to encode a video, where the video includes a picture sequence, and the encoder includes:
one or more processors;
one or more memories; and
one or more programs, where the one or more programs are stored in the one or more memories, and in addition, the one or more programs are configured to be executed by the one or more processors, and the one or more programs include:

an instruction configured to determine an independently decodable view in a to-be-encoded picture according to a configuration file corresponding to the video;

an instruction configured to divide the picture into at least two tiles (tile), where an area corresponding to one or more tiles that cover the independently decodable view is an independently decodable area;

an instruction configured to generate an auxiliary message corresponding to the picture, where the auxiliary message includes a location identifier of the independently decodable area, and the location identifier of the independently decodable area includes one or more tile identifiers (tile id); and an instruction configured to encode all tiles included in the picture to form an encoded video bitstream, where the encoded video bitstream includes the auxiliary message.

A decoder, including:
one or more processors;
one or more memories; and
one or more programs, where the one or more programs are stored in the one or more memories, and in addition, the one or more programs are configured to be executed by the one or more processors, and the one or more programs include:

an instruction configured to receive a video bitstream, where the video bitstream includes a to-be-decoded video and an auxiliary message, and the to-be-decoded video includes a to-be-decoded picture sequence;

an instruction configured to acquire a to-be-decoded picture;

an instruction configured to obtain a location identifier of an independently decodable area of the to-be-decoded picture according to the auxiliary message, where the location identifier of the independently decodable area includes tile identifiers (tile id) of one or more tiles (tile); and an instruction configured to obtain the independently decodable area of the to-be-decoded picture according to the location identifier of the independently decodable area, and decode the independently decodable area.

An encoder, disposed in a source apparatus for processing a video and configured to encode the video, where the video includes a picture sequence, and the encoder includes:

one or more circuits, configured to: determine an independently decodable view in a to-be-encoded picture according to a configuration file corresponding to the video; divide the picture into at least two tiles (tile), where an area corresponding to one or more tiles that cover the independently decodable view is an independently decodable area; generate an auxiliary message corresponding to the picture, where the auxiliary message includes a location identifier of the independently decodable area, and the location identifier of the independently decodable area includes one or more tile identifiers (tile id); and encode all tiles included in the picture to form an encoded video bitstream, where the encoded video bitstream includes the auxiliary message.

A decoder, where the decoder is disposed in a receiving apparatus for processing a video, including:

one or more circuits, configured to: receive a video bitstream, where the video bitstream includes a to-be-decoded video and an auxiliary message, and the to-be-decoded video includes a to-be-decoded picture sequence; acquire a to-be-decoded picture; obtain a location identifier of an independently decodable area of the to-be-decoded picture according to the auxiliary message, where the location identifier of the independently decodable area includes tile identifiers (tile id) of one or more tiles (tile); and obtain the independently decodable area of the to-be-decoded picture according to the location identifier of the independently decodable area, and decode the independently decodable area.

A computer-readable storage medium, where the computer-readable storage medium stores a plurality of instructions, and when the instructions are executed by a device, the device is triggered to perform the following operations:

determining an independently decodable view in a to-be-encoded picture in a video according to a configuration file corresponding to the video;

dividing the picture into at least two tiles (tile), where an area corresponding to one or more tiles that cover the independently decodable view is an independently decodable area;

generating an auxiliary message corresponding to the picture, where the auxiliary message includes a location identifier of the independently decodable area, and the location identifier of the independently decodable area includes one or more tile identifiers (tile id); and encoding all tiles included in the picture to form an encoded video bitstream, where the encoded video bitstream includes the auxiliary message.

A computer-readable storage medium, where the computer-readable storage medium stores a plurality of instructions, and when the instructions are executed by a device, the device is triggered to perform the following operations:

receiving a video bitstream, where the video bitstream includes a to-be-decoded video and an auxiliary message, and the to-be-decoded video includes a to-be-decoded picture sequence;

acquiring a to-be-decoded picture;

obtaining a location identifier of an independently decodable area of the to-be-decoded picture according to the auxiliary message, where the location identifier of the independently decodable area includes tile identifiers (tile id) of one or more tiles (tile); and obtaining the independently decodable area of the to-be-decoded picture according to the location identifier of the independently decodable area, and decoding the independently decodable area.

As described in the foregoing various implementation forms, optionally, the auxiliary message may further include an independently decodable area identifier, and the independently decodable area identifier is used to identify whether the picture includes the independently decodable area.

As described in the foregoing various implementation forms, optionally, the auxiliary message further includes cropping (cropping) information used for decoding the independently decodable area, and the cropping information includes a horizontal coordinate or a vertical coordinate of a top, bottom, left or right border of the independently decodable view relative to the independently decodable area.

As described in the foregoing various implementation forms, optionally, the auxiliary message further includes profile (profile) information used for decoding the independently decodable area, and the profile information is used to identify a coding tool set in the independently decodable area.

As described in the foregoing various implementation forms, optionally, the auxiliary message further includes level (level) information used for decoding the independently decodable area, the level information is used to identify level information that a decoder needs to satisfy, and the level information is obtained by means of calculation according to a ratio of the independently decodable area to the picture.

As described in the foregoing various encoding implementation forms, optionally, the step of encoding all tiles included in the to-be-encoded picture further includes: determining whether a current to-be-encoded tile is a tile in the independently decodable area; if yes, setting an independently decodable area of an encoded picture to be a candidate inter-frame reference area of the current tile; if no, setting a whole picture area of the encoded picture to be the candidate inter-frame reference area of the current tile; and when an inter-frame algorithm is used for encoding, selecting an optimal reference area according to the foregoing candidate inter-frame reference area corresponding to the to-be-encoded tile.

As described in the foregoing various implementation forms, optionally, the picture sequence includes pictures of different packing types and flipping types; and the configuration file stores a packing type and a flipping type of each frame of picture in the picture sequence, and independently decodable views corresponding to the pictures of different packing types and flipping types.

As described in the foregoing various implementation forms, optionally, the auxiliary message further includes location identifiers, which are corresponding to the pictures of different packing types and flipping types, of independently decodable areas.

As described in the foregoing various implementation forms, optionally, the auxiliary message further includes cropping information that is corresponding to the pictures of different packing types and flipping types and used for decoding the independently decodable areas.

As described in the foregoing various decoding implementation forms, optionally, the implementation forms further include: cropping the independently decodable area according to the cropping information in the auxiliary message to obtain the independently decodable view.

As described in the foregoing various implementation forms, optionally, the auxiliary message further includes profile information that is corresponding to the pictures of different packing types and flipping types and used for decoding the independently decodable areas.

As described in the foregoing various implementation forms, optionally, the auxiliary message further includes level information that is corresponding to the pictures of different packing types and flipping types and used for decoding the independently decodable areas.

As described in the foregoing various implementation forms, optionally, the auxiliary message is carried in supplemental enhancement information (Supplemental Enhancement Information, SEI).

As described in the foregoing various implementation forms, optionally, the auxiliary message is carried in a sequence parameter set (Sequence Parameter Set, SPS).

A video encoding and decoding system, including the encoder provided in the foregoing various implementation forms and the decoder provided in the foregoing various implementation forms.

A video bitstream, including: a to-be-decoded video and an auxiliary message, where the to-be-decoded video includes a to-be-decoded picture sequence, and the auxiliary message includes a location identifier that indicates an independently decodable area of the picture sequence, where the location identifier of the independently decodable area includes tile identifiers (tile id) of one or more tiles (tile).

Technical effects of the foregoing implementation forms are analyzed as follows: encoded According to the foregoing encoding implementation forms, an auxiliary message is added to a bitstream, where Profile and Level information in the auxiliary message applies only to a sub-bitstream formed for an independently decodable area, which lowers a requirement for performance of a decoder.

According to the foregoing decoding implementation forms, a decoder may obtain, according to an auxiliary message, only an independently decodable area in a picture to perform decoding, that is, the decoding is performed only on the independently decodable area, thereby lowering a requirement for performance of the decoder and saving calculation and storage resources of the decoder. In addition, a profile and level requirement corresponding to a sub-bitstream of an independently encodable area generally lowers a requirement for performance and storage of the decoder. Therefore, after the decoder is initialized, decoding time and electric power consumption of the decoder can be reduced and the requirement for the storage of the decoder is lowered. If the decoder does not meet a profile and level requirement of an original video bitstream, but the decoder meets the profile and level requirement corresponding to a sub-bitstream of an independently encodable area, then support of the decoder for a 3D video bitstream that has a high requirement for a resolution or bit rate and is compatible with 2D display is increased.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following first describes basic concepts for understanding the solutions of the present invention.

Largest coding unit (largest coding unit, LCU): A smallest picture division unit in a high efficiency video coding (high efficiency video coding, HEVC) technology, which is shown as a small cell in FIG. 3. The LCU may be a block of 64*64 pixels. Before an HEVC encoder encodes a frame of picture, the picture is first divided into a grid that uses the LCU as a unit.

Coding unit (coding unit, CU): An encoder dynamically determines optimal coding unit division according to the magnitude of texture details of a picture. One LCU may be divided into one or more coding units, and encoding and decoding are separately performed by using the CU as a unit.

Figure 1:
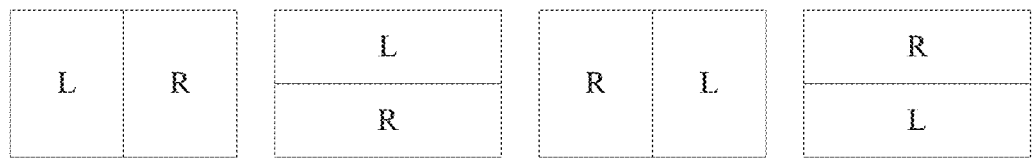
FIG. 1 is a schematic diagram of a view packing type of a video bitstream that uses a frame packing 3DTV technology in the prior art.
Figure 2:
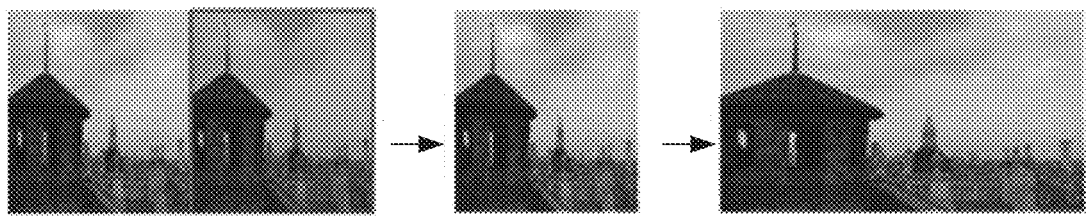
FIG. 2 is a schematic diagram of a processing process of outputting a video bitstream that uses a frame packing 3DTV technology to a 2D display device in the prior art.
Figure 3:
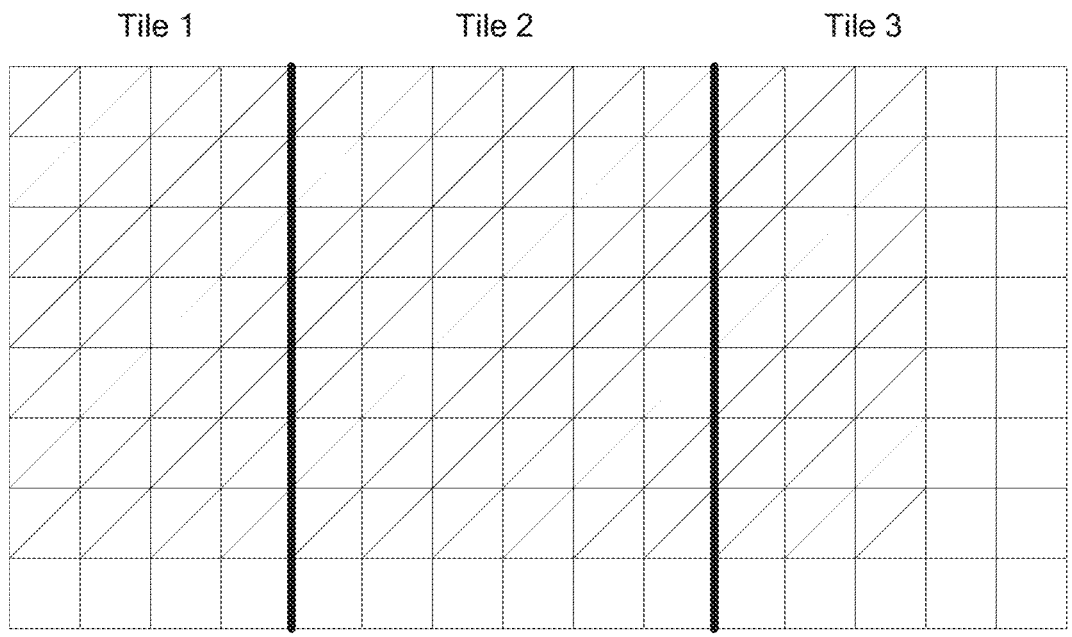
FIG. 3 is a schematic structural diagram of a to-be-encoded picture in the prior art.

Tile (tile): In a higher-level picture division method, a picture is divided into m rows and n columns, where each divided block is referred to as the Tile. As shown in FIG. 3, a picture is divided into 1 row and 3 columns. Both the row and column of the Tile use the LCU as a smallest unit, that is, one LCU cannot belong to two tiles at the same time. After the tile division is determined, an encoder allocates a tile identifier (tile id) first in a left-to-right sequence and then in a top-to-bottom sequence. Generally, size division of the tile is performed according to a configuration file corresponding to a picture. The configuration file generally stores input parameters that need to be predetermined in an encoding process of the encoder, e.g. a coding tool, a coding limitation, and a property of a to-be-encoded picture.

Independent tile (independent tile): A type of tile, during intra-frame prediction, mutual reference cannot be made between a CU in an independent tile and a CU in another independent tile.

Dependent tile (dependent tile): A type of tile, during intra-frame prediction, a CU in the dependent tile can refer to a CU in an independent tile.

The HEVC encoder performs encoding by using the LCU as a smallest unit. If a width and a height of a picture are not an integer multiple of the LCU, supplementing needs to be performed before the encoding. As shown in FIG. 3, LCUs in a shaded part with diagonal lines are a picture area, and LCUs in a blank part are a supplementary part, which is referred to as LCU alignment. Before a decoder completes decoding and outputs a video stream, the previously supplemented LCU part needs to be cropped and then the video stream is output, which is referred to as cropping (cropping).

As shown in FIG. 3, each LCU is sequentially assigned an address starting from 0 first in a left-to-right sequence and then in a top-to-bottom sequence, and the address is referred to as an LCU address; then a tile to which any LCU address belongs may be calculated according to the tile division, that is, a look-up table from the LCU address to a Tile id may be established.

Generally, a to-be-encoded video may be considered as a picture sequence, and a video bitstream is formed after the encoding, where the video bitstream includes an encoded picture sequence and a parameter set that is required for decoding the picture. An access unit (access unit, AU) includes a frame of encoded picture and a parameter set that is required for decoding the picture, or an AU includes only a frame of encoded picture.

In the parameter set for decoding the picture, a 1-bit identifier tile_splittable_flag is defined in a video usability information (video usability information, VUI) parameter structure, where tile_splittable_flag indicates that a tile in the bitstream suits the following features:

1. The Tile division remains unchanged for each picture in the picture sequence;

2. For different frames in the sequence, prediction reference can be made only between tiles with a same id;

3. Loop filtering is separately performed on each tile, and a complete picture is reconstructed by several decoded CUs. A CU in the picture may be predicted according to a different part of a different reference frame, and an error may exist between an original picture and this picture obtained by the prediction and decoding, which causes discontinuity on a border of adjacent CUs. The loop filtering is a filtering operation that is performed on the whole picture to eliminate this discontinuity.

Figure 4:
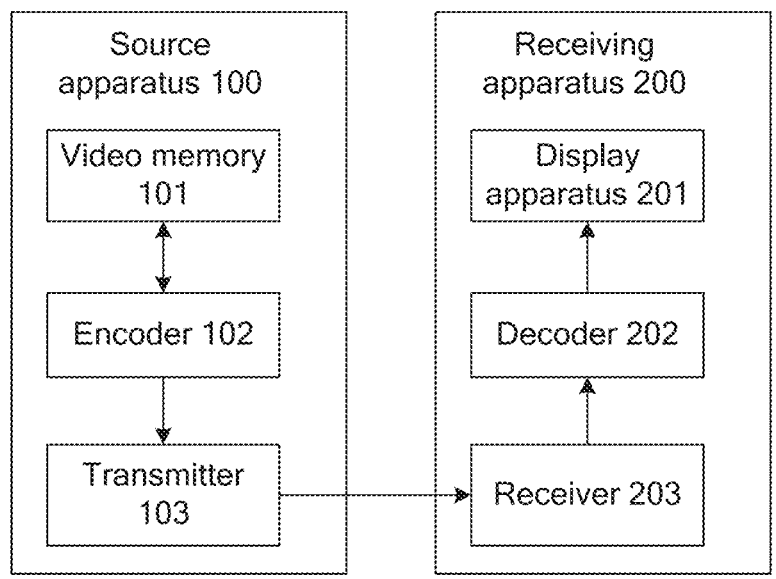
FIG. 4 is an architecture diagram of a video encoding and decoding system according to an embodiment of the present invention.

As shown in FIG. 4, which is a system architecture diagram for implementing a video encoding and decoding method according to an embodiment of the present invention, a source apparatus 100 is a video head-end device on a network side, where the source apparatus 100 includes a video memory 101 that is configured to store a video (that is, a picture sequence) before and after encoding, an encoder 102 that is configured to encode the picture sequence, and a transmitter 103 that is configured to transmit an encoded bitstream to another apparatus. The source apparatus 100 may further include a video capturing apparatus, such as a video camera, for capturing a video and storing the captured video in the video memory 101, and may further include another element, such as an intra-frame encoder element, various filters.

The video memory 101 generally includes relatively large storage space. For example, the video memory 101 may include a dynamic random access memory (DRAM) or a FLASH memory. In another embodiment, the video memory 101 may include a non-volatile memory or any other data storage apparatus.

The encoder 102 may be a part of a device that performs the video encoding. As a specific embodiment, the encoder may include a chip set that is used for encoding and decoding a video and include some combination of hardware, software, firmware, a processor or digital signal processing (DSP).

The transmitter 103 performs signal modulation on the video bitstream by using a wired network, a wireless network, or another manner, and then transmits the video bitstream to a receive end.

A receiving apparatus 200 is a terminal device on a user side, where the receiving apparatus 200 includes a receiver 203 that is configured to receive the encoded video bitstream, a decoder 202 that is configured to decode the video bitstream, and a display apparatus 201, such as an LED TV, that outputs the decoded video to a terminal user. The receiving apparatus 200 may further include another element, such as a modem, a signal amplifier and a memory.

The decoder 202 may be a part of a device that performs the video decoding. As a specific embodiment, the decoder may include a chip set that is used for encoding and decoding a video and include some combination of hardware, software, firmware, a processor or digital signal processing (DSP).

The display apparatus 200 may be a 2D display device, or a display device that is compatible with 2D or 3D at the same time, such as a display, a TV and a projector.

Figure 5:
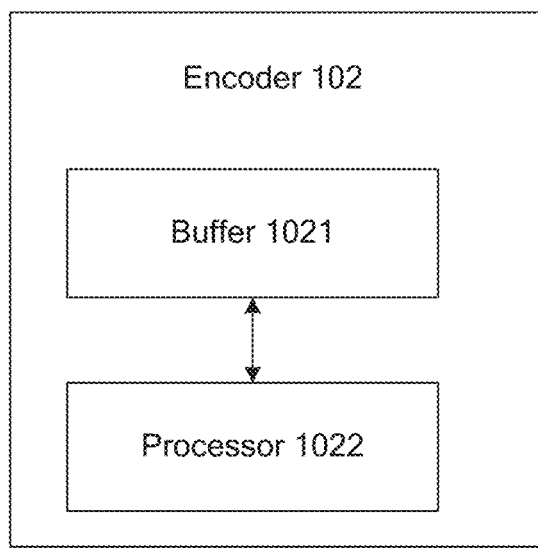
FIG. 5 is a structural diagram of hardware of an encoder according to an embodiment of the present invention.

As shown in FIG. 5, which is a structural diagram of further detailed hardware of the encoder 102 shown in FIG. 4, the encoder 102 includes a buffer 1021 and a processor 1022. The buffer 1021 includes storage space smaller and faster than that of the video memory 101. For example, the buffer 1021 may include a synchronous random access memory (SRAM). The buffer 1021 may include an "on-chip" memory, and the buffer 1021 is integrated with another component of the encoder 102 to provide very fast data access in an intensive coding process of the processor 1022. During encoding of a given picture sequence, a to-be-encoded picture sequence may be sequentially loaded from the video memory 101 to the buffer 1021. In addition, the buffer 1021 is further configured to store a configuration file of a to-be-encoded video, a software program that is used to execute a specific encoding algorithm, and the like. In some cases, the buffer 1021 is further configured to store a picture for which encoding is completed, where sending time of the picture is not reached or the picture is used to provide reference for encoding a next frame of picture. In another embodiment, a memory that has a storage function may be used as the buffer 1021. The processor 1022 acquires a to-be-encoded picture from the buffer 1021 and performs encoding on the picture until the picture sequence included in the video is encoded.

Figure 6:
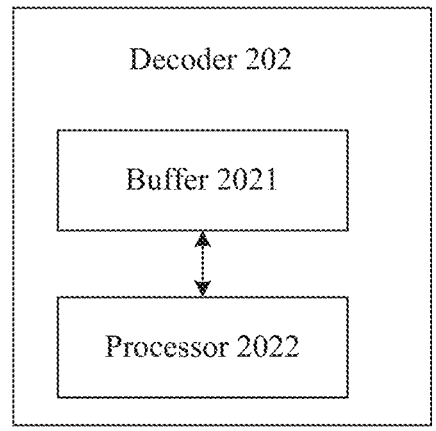
FIG. 6 is a structural diagram of hardware of a decoder according to an embodiment of the present invention.

As shown in FIG. 6, which is a structural diagram of further detailed hardware of the decoder 202 shown in FIG. 4, the decoder 202 includes a buffer 2021 and a processor 2022. The buffer 2021 is smaller and faster storage space. For example, the buffer 2021 may include a synchronous random access memory (SRAM). The buffer 2021 may include an "on-chip" memory, and the buffer 2021 is integrated with another component of the decoder 202 to provide very fast data access in an intensive coding process of the processor 2022. During decoding of a given picture sequence, a to-be-decoded picture sequence may be loaded to the buffer 2021. In addition, the buffer 2021 further stores a software program that is used to execute a specific decoding algorithm, and the like. In addition, the buffer 2021 may be further configured to store a picture for which decoding is completed but display time is not reached, or the picture needs to be used as a reference frame for decoding a subsequent picture. In another embodiment, a memory that has a storage function may be used as the buffer 2021. The processor 2022 acquires a to-be-decoded picture from the buffer 2021 and performs decoding on the picture until the picture sequence included in a video bitstream is decoded.

According to this embodiment of the present invention, in a process of performing encoding by the encoder 102, an auxiliary message is added to an encoded bitstream. For example, the auxiliary message is stored in supplemental enhancement information (Supplemental Enhancement Information, SEI) or a sequence parameter set (Sequence Parameter Set, SPS) to assist the decoder 202 in decoding. Firstly, an independently decodable area identifier may be added to the auxiliary message to identify that an independently decodable area exists in the encoded bitstream. A view part that is of each frame of picture in a 3D video bitstream and finally displayed by a 2D display device is an independently decodable view; corresponding to tile division, an area that covers the independently decodable view is an independently decodable area. In addition, the auxiliary message itself may also be considered as an independently decodable identifier. If the encoded video bitstream includes the auxiliary message, it is considered that the independently decodable area exists in the bitstream; otherwise, the independently decodable area does not exist. The decoder 202 obtains an independently decodable area of each picture in the encoded video bitstream (that is, a picture sequence), and then performs normal decoding.

When the encoder 102 in this embodiment of the present invention determines the independently decodable area, it is required to ensure that features of the independently decodable area are as follows:

in each frame of picture with a same packing type and flipping type, a location and a size of the independently decodable area remain unchanged;

for a CU in the independently decodable area, a reference picture block for an inter-frame prediction is selected from the independently decodable area of the picture with the same packing type and flipping type; and loop filtering is separately performed in the independently decodable area.

The auxiliary message may further include the following information: a location identifier of the independently decodable area, cropping information used for outputting and displaying the independently decodable area, and profile and level information of a sub-picture sequence (that is, a sub-bitstream) formed by a sub-picture in the independently decodable area.

Figure 7:
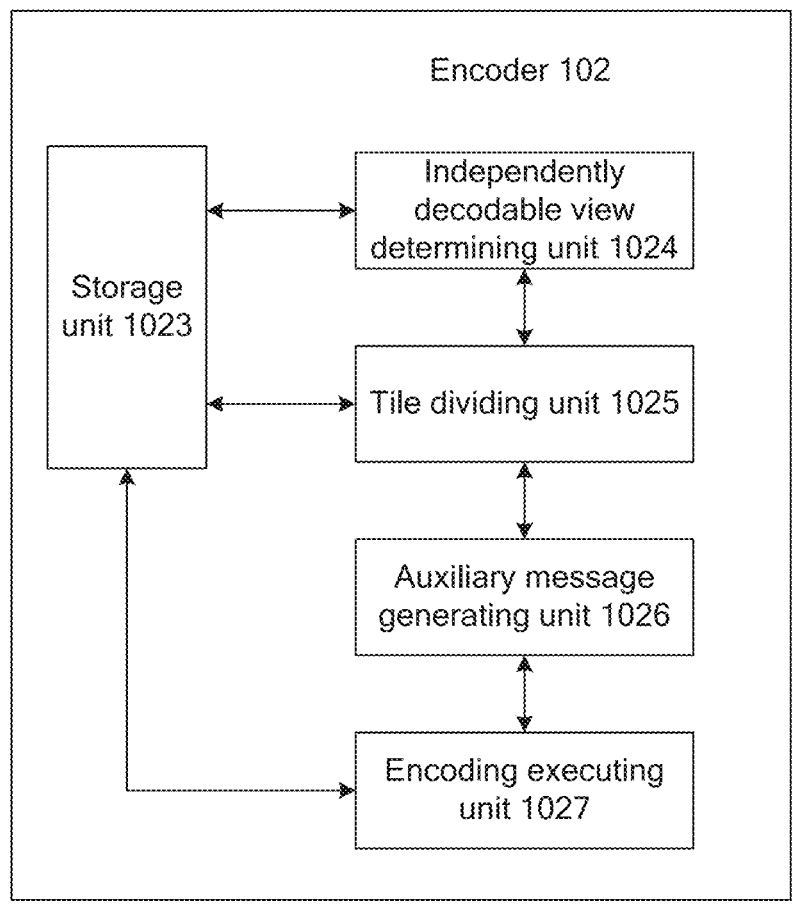
FIG. 7 is a functional block diagram of an encoder according to an embodiment of the present invention.

As an optional embodiment, the buffer 1021 of the encoder 102 shown in FIG. 5 may be implemented by using a storage unit 1023 shown in FIG. 7; in addition, the processor 1022 may be implemented by using an independently decodable view determining unit 1024, a tile dividing unit 1025, an auxiliary message generating unit 1026 and an encoding executing unit 1027 shown in FIG. 7. As an optional embodiment, the encoder 102 shown in FIG. 5 may execute an encoding method provided in FIG. 10, FIG. 11, FIG. 13, FIG. 14, FIG. 16 and FIG. 17.

Figure 8:
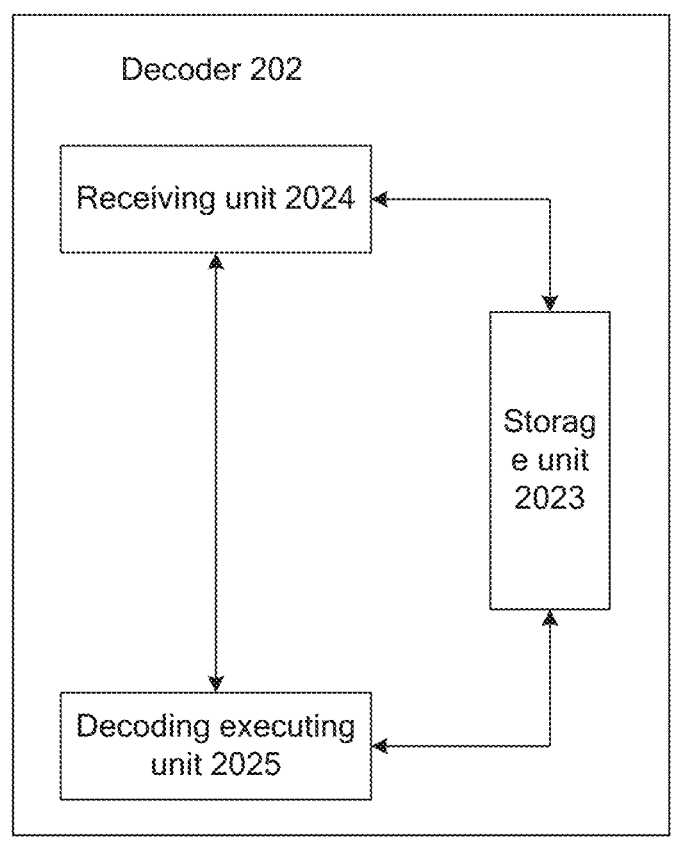
FIG. 8 is a functional block diagram of a decoder according to an embodiment of the present invention.

As an optional embodiment, the buffer 2021 of the decoder 202 shown in FIG. 6 may be implemented by using a storage unit 2023 shown in FIG. 8; in addition, the processor 2022 may be implemented by using a receiving unit 2024 and a decoding executing unit 2025 shown in FIG. 8. The decoder 102 shown in FIG. 6 may execute a decoding method provided in FIG. 12, FIG. 15 and FIG. 18.

As shown in FIG. 7, which is a schematic diagram of function module composition of an encoder according to an embodiment of the present invention, an encoder 102 includes: a storage unit 1023, an independently decodable view determining unit 1024, a tile dividing unit 1025, an auxiliary message generating unit 1026 and an encoding executing unit 1027. The storage unit 1023 is configured to store a configuration file of a video; the independently decodable view determining unit 1024 is configured to determine an independently decodable view in a to-be-encoded picture according to the configuration file corresponding to the video; the tile dividing unit 1025 is configured to divide the picture into at least two tiles (tile), where an area corresponding to one or more tiles that cover the independently decodable view is an independently decodable area; the auxiliary message generating unit 1026 is configured to generate an auxiliary message corresponding to the picture, where the auxiliary message includes a location identifier of the independently decodable area, and the location identifier of the independently decodable area includes one or more tile identifiers (tile id); and the encoding executing unit 1027 is configured to encode all tiles included in the picture to form an encoded video bitstream, where the encoded video bitstream includes the auxiliary message. The encoding executing unit further includes a determining unit, where the determining unit is configured to: determine whether a current to-be-encoded tile is a tile in the independently decodable area; if yes, set an independently decodable area of an encoded picture to be a candidate inter-frame reference area of the current tile; if no, set a whole picture area of the encoded picture to be the candidate inter-frame reference area of the current tile; and when an inter-frame algorithm is for encoding, select an optimal reference area according to the foregoing candidate inter-frame reference area corresponding to the to-be-encoded tile.

More specifically, the storage unit 1023 is further configured to load the to-be-encoded picture and load a picture for which encoding is completed by the encoding executing unit 1027. The independently decodable view determining unit 1024 may further perform step S301 and step S302 shown in FIG. 10, and step S401 shown in FIG. 11; the tile dividing unit 1025 may further perform step S402 shown in FIG. 11; the auxiliary message generating unit 1026 may further perform step S403 and step S404 shown in FIG. 11; and the encoding executing unit 1027 may further perform step S405 to step S409 shown in FIG. 11.

In another embodiment of the present invention, the storage unit 1023 is further configured to load the to-be-encoded picture and load a picture for which encoding is completed by the encoding executing unit 1027. The independently decodable view determining unit 1024 may further perform step S601 to step S603 shown in FIG. 13; the tile dividing unit 1025 may further perform step S701 and step S702 shown in FIG. 14; the auxiliary message generating unit 1026 may further perform step S604 shown in FIG. 13; and the encoding executing unit 1027 may further perform step S703 to step S707 shown in FIG. 14.

In yet another embodiment of the present invention, the storage unit 1023 is further configured to load the to-be-encoded picture and load a picture for which encoding is completed by the encoding executing unit 1027. The independently decodable view determining unit 1024 may further perform step S901 and step S902 shown in FIG. 16; the tile dividing unit 1025 may further perform step S903 and step S904 shown in FIG. 16; the auxiliary message generating unit 1026 may further perform step S905 shown in FIG. 16; and the encoding executing unit 1027 may further perform step S1001 to step S1006 shown in FIG. 17.

As shown in FIG. 8, which is a schematic diagram of functional block composition of a decoder according to an embodiment of the present invention, a decoder 202 includes: a storage unit 2023, a receiving unit 2024 and a decoding executing unit 2025. The storage unit 2023 is configured to store a to-be-decoded picture and load a picture for which decoding is completed by the decoding executing unit 2025 but display time is not reached. The receiving unit 2024 is configured to receive a video bitstream, where the video bitstream includes a to-be-decoded video and an auxiliary message, and the to-be-decoded video includes a to-be-decoded picture sequence. The decoding executing unit 2025 is configured to: acquire the to-be-decoded picture; obtain a location identifier of an independently decodable area of the to-be-decoded picture according to the auxiliary message, where the location identifier of the independently decodable area includes tile identifiers (tile id) of one or more tiles (tile); and obtain the independently decodable area of the to-be-decoded picture according to the location identifier of the independently decodable area, and decode the independently decodable area.

Figure 12:
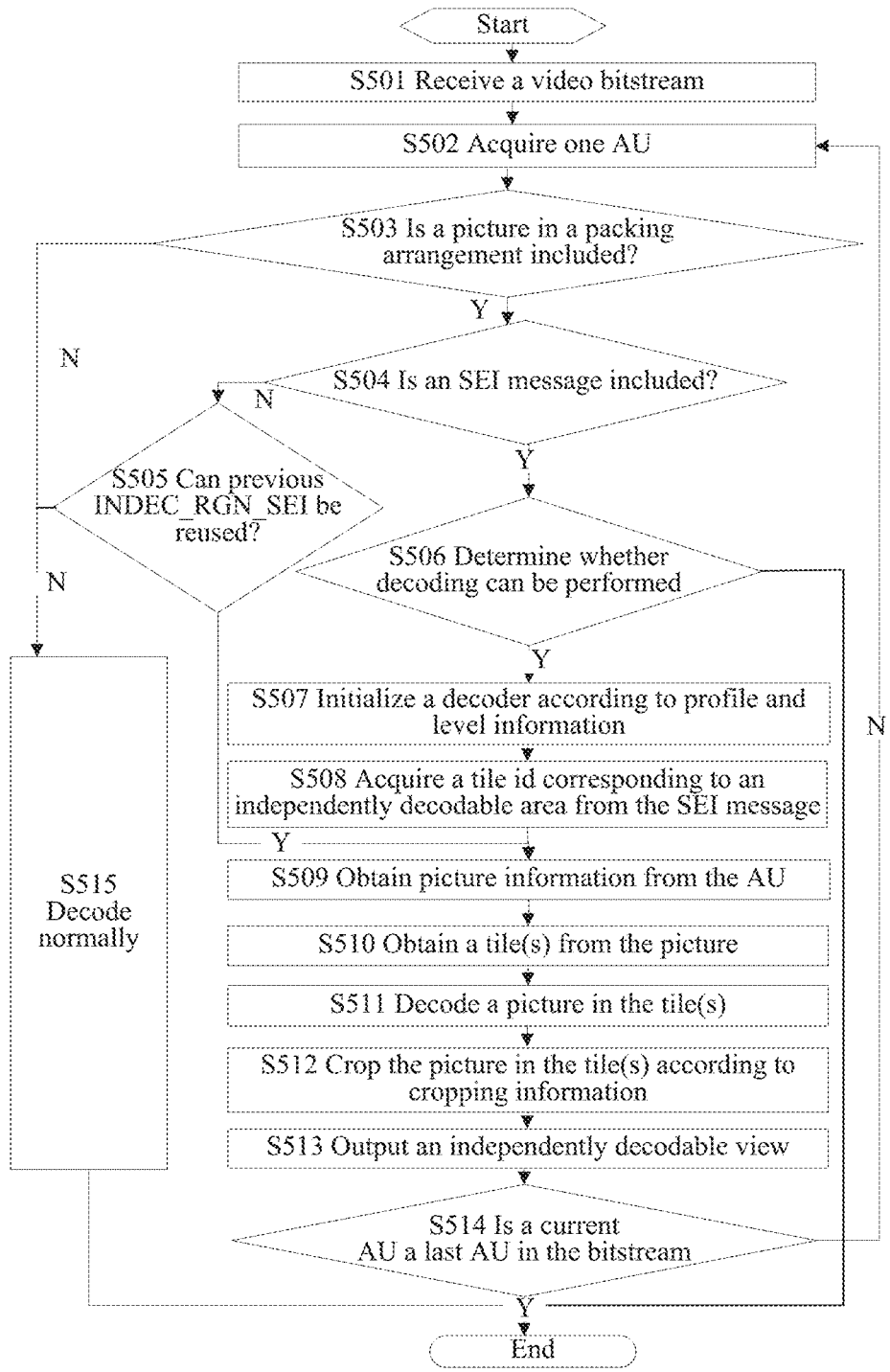
FIG. 12 is a flowchart of a video decoding method according to an implementation manner of the present invention.

More specifically, the receiving unit 2024 is further configured to perform step S501 shown in FIG. 12; and the decoding executing unit 2025 is further configured to perform step S502 to step S515 shown in FIG. 12.

Figure 15:
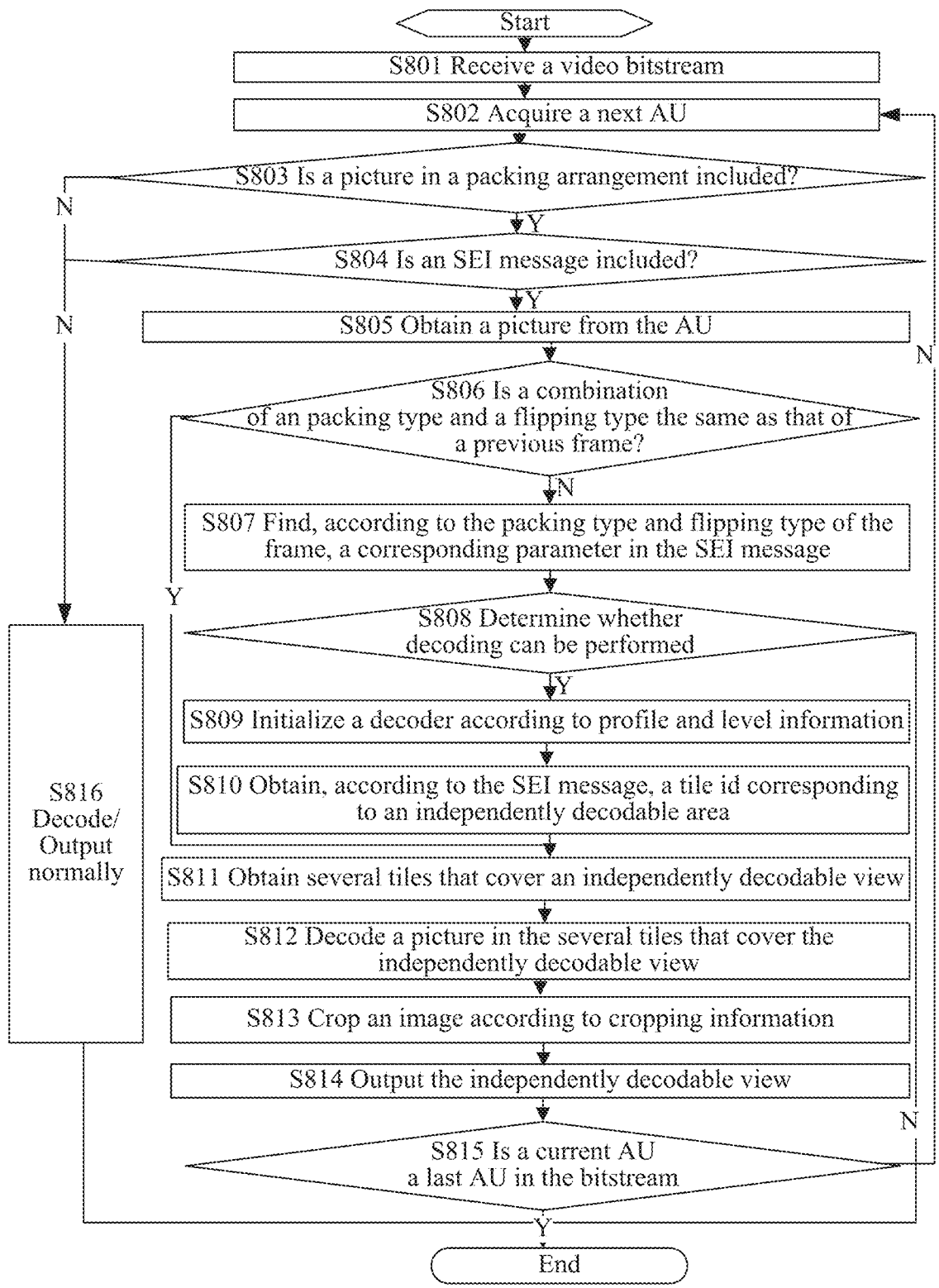
FIG. 15 is a flowchart of yet another decoding method according to an implementation manner of the present invention.

In another embodiment of the present invention, the receiving unit 2024 is further configured to perform step S801 shown in FIG. 15; and the decoding executing unit 2025 is further configured to perform step S802 to step S816 shown in FIG. 15.

Figure 18:
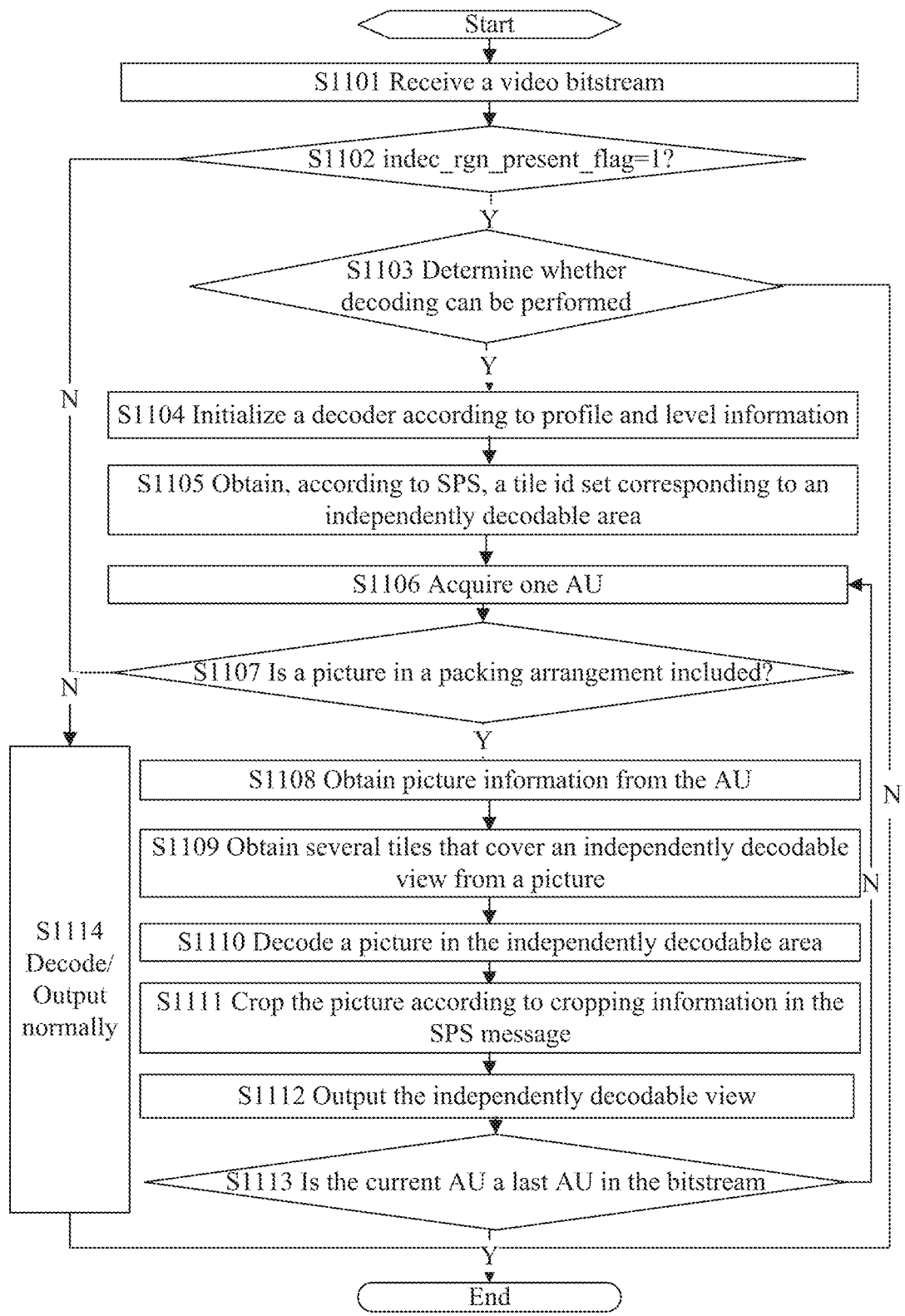
FIG. 18 is a flowchart of still another decoding method according to an implementation manner of the present invention.

In another embodiment of the present invention, the receiving unit 2024 is further configured to perform step S1101 shown in FIG. 18; and the decoding executing unit 2025 is further configured to perform step S1102 to step S1114 shown in FIG. 18.

Figure 9:
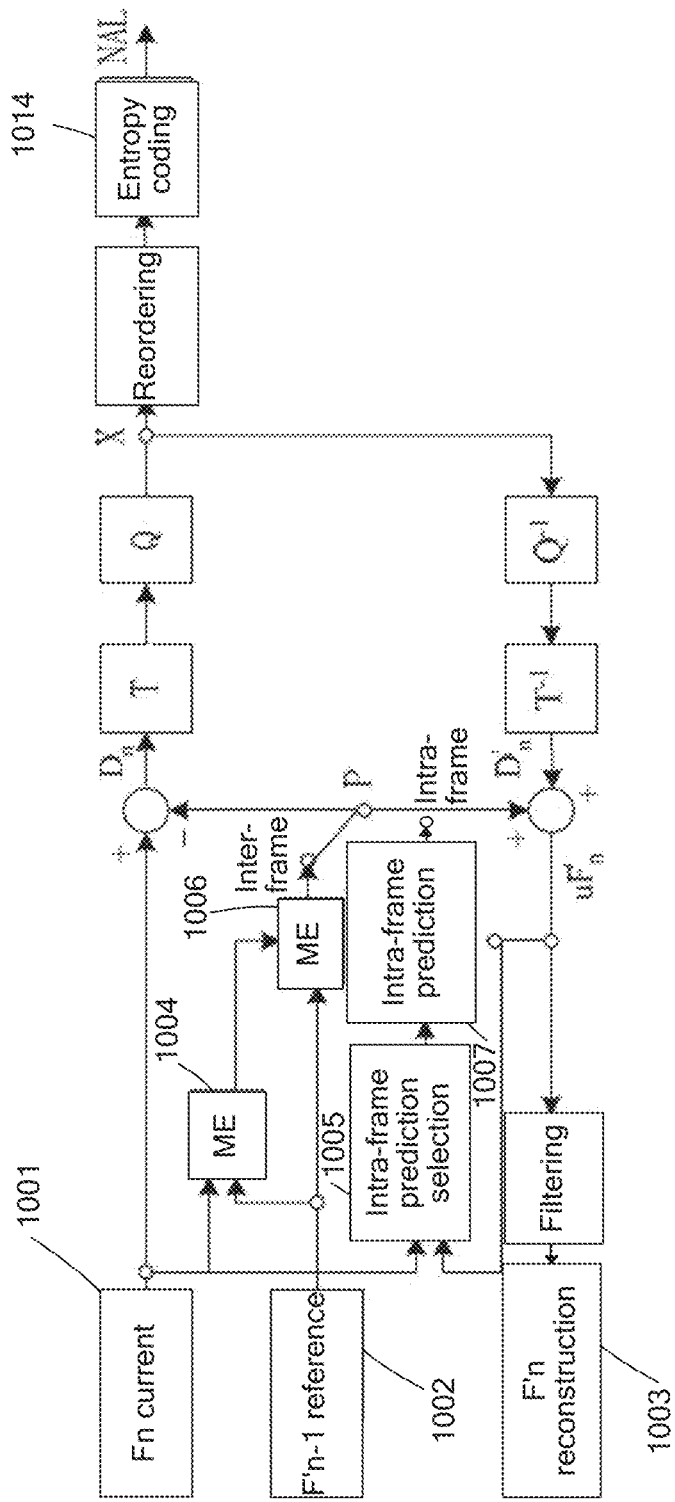
FIG. 9 is a structural diagram of hardware of an encoder according to an embodiment of the present invention.

As shown in FIG. 9, which is a structural diagram of specific implementation of an encoder according to an embodiment of the present invention, Fn current 1001 is a frame of currently to-be-encoded picture in a to-be-encoded video, and F'n−1 reference 1002 is a frame of encoded picture in the to-be-encoded video and provides an encoding reference for the currently to-be-encoded picture.

The input frame Fn current 1001 is processed according to an intra-frame or inter-frame prediction coding method. If the intra-frame prediction coding is used, a prediction value PRED (represented by P in the figure) of the Fn current 1001 is obtained after motion compensation 1006 (MC) is performed on a previously encoded reference image in the Fn current 1001, where the reference image is represented by F'n−1 reference 1002. To improve prediction precision so as to improve a compression ratio, an actual reference image may be selected from an encoded, decoded, reconstructed, or filtered frame. After the prediction value PRED is subtracted from a current block, a residual block Dn is generated, and after transformation and quantization, a group of quantized transform coefficients X are generated. Then after entropy encoding 1014, the transform coefficients X and some information (such as a prediction mode quantization parameter and a motion vector) that is required for decoding form a compressed bitstream, and the compressed bitstream passes through an NAL (network adaptive layer) for transmission and storage.

As described above, to provide a reference image for further prediction, the encoder needs to have a function of reconstructing an image. Therefore, Fn' reconstruction 1003, that is obtained after inverse quantization and inverse transformation are performed on a residual image, and the prediction value P must be added together to obtain uFn' (an unfiltered frame). To remove noise generated in an encoding and decoding loop and improve image quality of a reference frame so as to improve performance of image compression, a loop filter is disposed, and the filtered and output Fn' reconstruction 1003, that is, a reconstructed image, may be used as the reference image.

In the present invention, during selection of an ME and an intra-frame prediction mode, a limitation on a reference range of a coding unit outside an independently decodable area is removed (for details, refer to the description in FIG. 10 to FIG. 18). Therefore, a more similar reference unit may be selected to improve the prediction precision, thereby improving the compression ratio.

Figure 10:
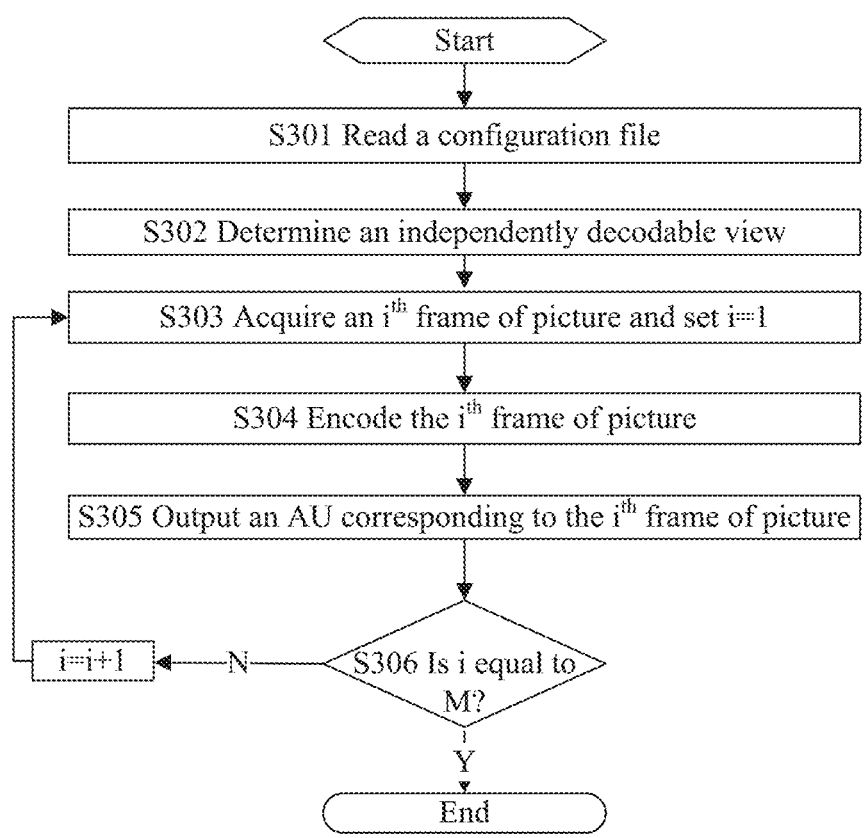
FIG. 10 is a flowchart of a video encoding method according to an embodiment of the present invention.

FIG. 10 shows a video encoding method according to an embodiment of the present invention. In this embodiment, the foregoing auxiliary message is carried in an SEI message. A view part that is of each frame of picture in a 3D video bitstream and finally displayed by a 2D display device is an independently decodable view; corresponding to tile division, an area that covers the independently decodable view is an independently decodable area. The SEI message includes an independently decodable area identifier. The independently decodable area corresponds to one tile, that is, one type of tile division is used to include the independently decodable view within a range of one tile. A to-be-encoded video, that is, a to-be-encoded picture sequence, may include pictures that have different packing types and different flipping types.

The encoding method shown in FIG. 10 is a process of encoding a video by an encoder, where the video is a picture sequence whose length is M frames. A two-view packing form is used as an example for each frame of picture, and one view thereof is a finally displayed part at the 2D display device, that is, the foregoing independently decodable view. For a person skilled in the art, an encoding method of a picture packed by two or more views may be obtained by simply transforming this method.

Step S301: Read a configuration file of the to-be-encoded video, where the configuration file stores an input parameter that needs to be predetermined in an encoding process of the encoder, such as a coding tool, a coding limitation, a property of a to-be-encoded picture.

Step S302: Determine, according to the configuration file, a view that needs to be independently decoded in the picture sequence. In this embodiment, an independently decodable view corresponding to a picture of each packing type and flipping type in a whole picture sequence is preset in the configuration file, such as a left view or a right view in a frame of picture. Independently decodable views corresponding to pictures of a same packing type and flipping type are same, and independently decodable views corresponding to pictures of different packing types and flipping types are different.

Step S303: Acquire an $i^{th}$ frame of picture in the picture sequence and set i=1.

Step S304: Encode the $i^{th}$ frame of picture, where a specific encoding process is described in detail in the following FIG. 11.

Step S305: Output an AU corresponding to an $i^{th}$ frame of currently encoded picture and save the AU in a storage apparatus of the encoder or an external storage apparatus, such as a video memory 101 of a source apparatus 100 or a buffer 1021 of an encoder 102, or directly transmit the AU to a remote receiving apparatus 200 by using a network.

Step S306: If i is equal to M (that is, the $i^{th}$ frame is a last frame), encoding ends; otherwise, i=i+1, and step S303 is performed.

Figure 11:
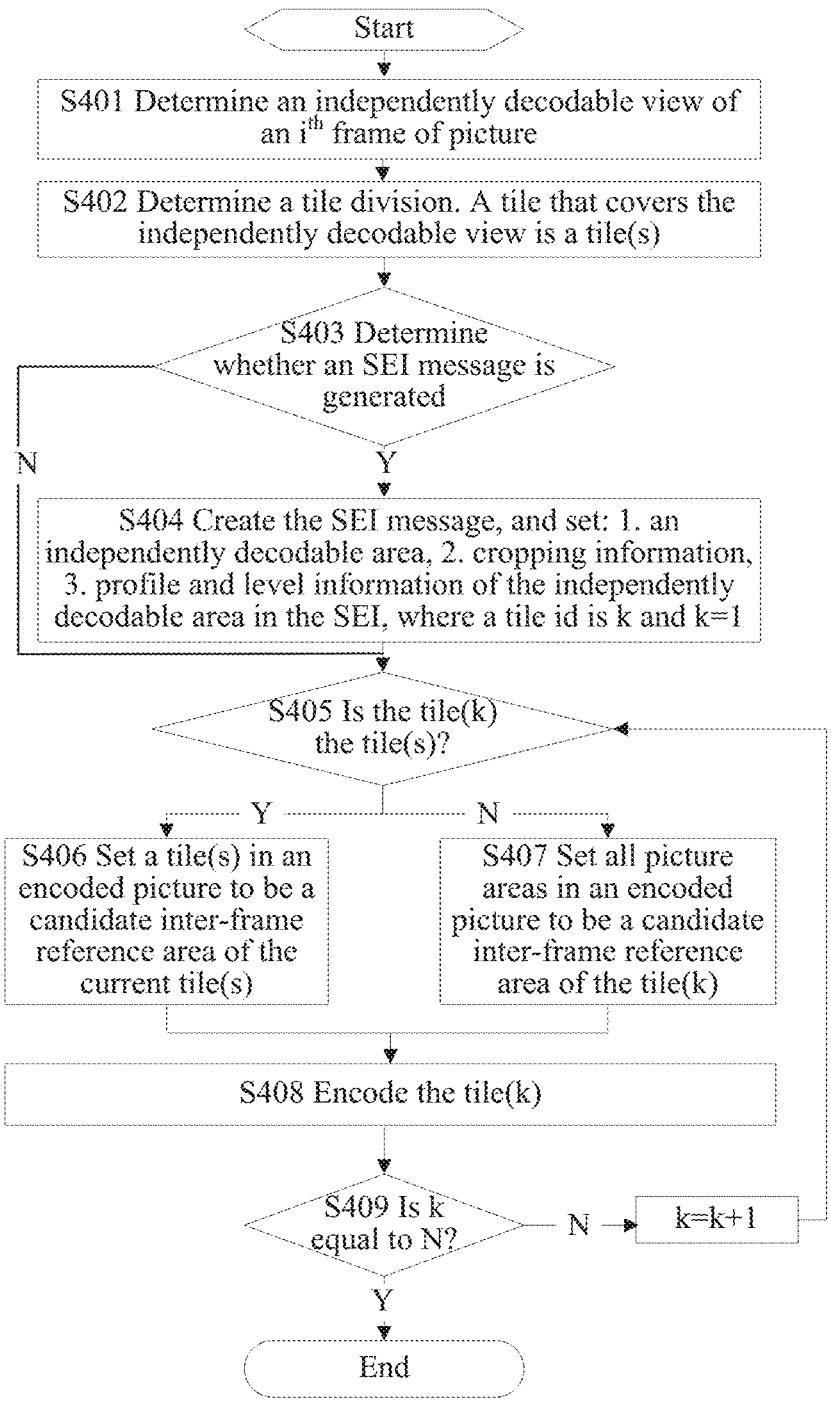
FIG. 11 is a flowchart of a specific method for encoding a frame of picture in the method process shown in FIG. 10.

FIG. 11 is a schematic flowchart of a specific method for encoding a frame of picture in step S304 in the video encoding method shown in FIG. 10.

Step S401: Acquire, according to the configuration file, an independently decodable view corresponding to a packing type and flipping type of the current $i^{th}$ frame of picture.

Step S402: Determine the tile division according to a smallest tile that covers the independently decodable view. That is, the independently decodable view is included within the range of one tile, and in addition, top, bottom, left and right of the tile division need to meet a requirement of LCU alignment. An area corresponding to the tile is the independently decodable area. The $i^{th}$ frame of picture is then divided into tiles formed by the smallest tile that covers the independently decodable area and an area except the smallest tile that covers the independently decodable area, two tiles in total, and the number N of tiles is set to 2. In another embodiment of the present invention, the number of tiles is not limited to 2. A tile id is allocated first in a left-to-right sequence and then in a top-to-bottom sequence, and an id of the smallest tile that covers the independently decodable view is preset to s. In another embodiment of the present invention, the smallest tile that covers the independently decodable view is not necessarily used as a benchmark in the tile division, so long as the following requirements are met: the tile covers the independently decodable view and top, bottom, left and right borders of the tile meet an LCU alignment requirement.

Step S403: Determine whether an SEI message needs to be generated, where a determining condition is: if the current $i^{th}$ frame of picture is a $1^{st}$ frame of picture in a to-be-encoded video bitstream, or the current $i^{th}$ frame of picture is not a $1^{st}$ frame of picture but is different from a previous frame in the packing type or flipping type, then the SEI message needs to be generated and step S404 is performed; or if the current $i^{th}$ frame of picture is not a $1^{st}$ frame of picture in a to-be-encoded video bitstream, and the packing type or flipping type of the current $i^{th}$ frame of picture is the same as that of a previous frame, then step S405 is performed. That is, in this embodiment, consecutive pictures of the same packing type and flipping type correspond to one SEI message. If the packing types and flipping types of two consecutive frames of pictures are different, a new SEI message needs to be generated.

Step S404: Create the SEI message, which is temporarily named INDEC_RGN_SEI in the present invention, and set each field of the SEI message, where the SEI message is defined in the following table.

|  | Descriptor |
| --- | --- |
| INDEC_RGN_SEI(payloadSize){ |  |
| tile_id | ue(v) |
| cropping_enable_flag | u(1) |
| new_profile_flag | u(1) |
| new_level_flag | u(1) |
| if (cropping_enable_flag) { |  |
| pic_crop_left_offset | ue(v) |
| pic_crop_right_offset | ue(v) |
| pic_crop_top_offset | ue(v) |
| pic_crop_bottom_offset | ue(v) |
| } |  |
| if (new_profile_flag) { |  |
| profile_idc | ue(v) |
| } |  |
| if(new_level_flag) { |  |
| level_idc | ue(v) |
| } |  |
| } |  |

The ue(v) in the table indicates that a length of the field is variable, u(n) indicates that the length of the field is n bits (bit), and u(1) identifies that the length of the field is 1 bit.

Location identifier information of the independently decodable area:

tile_id: An id of the smallest tile that covers the independently decodable view, which is s in this embodiment.

The following is cropping information of the independently decodable area:

cropping_enable_flag: If a width of the independently decodable view included in the tile(s) is equal to a width of the tile(s), and a height of the independently decodable view is equal to a height of the tile(s), cropping_enable_flag is set to false; otherwise, cropping_enable_flag is set to true.

pic_crop_left_offset: Includes a horizontal coordinate of a left edge of the independently decodable view relative to the tile(s), and a pixel is used as a unit.

pic_crop_right_offset: Includes a horizontal coordinate of a right edge of the independently decodable view relative to the tile(s), and a pixel is used as a unit.

pic_crop_top_offset: Includes a vertical coordinate of a top edge of the independently decodable view relative to the tile(s), and a pixel is used as a unit.

pic_crop_bottom_offset: Includes a vertical coordinate of a bottom edge of the independently decodable view relative to the tile(s), and a pixel is used as a unit.

The following is profile and level information of a sub-bitstream of an independently decodable area (that is, an area corresponding to the tile(s)):

new_profile_flag: Indicates whether an identifier of a profile of the sub-bitstream of the independently decodable area is the same as an identifier of a profile of a whole bitstream. If a value of new_profile_flag is 0, it indicates that they are the same; if the value of new_profile_flag is 1, it indicates that they are different.

new_level_flag: Indicates whether an identifier of a level of the sub-bitstream of the independently decodable area is the same as an identifier of a level of a whole bitstream. If a value of new_level_flag is 0, it indicates that they are the same; if the value of new_level_flag is 1, it indicates that they are different.

profile_idc: A profile id that a coding tool set in the independently decodable area applies.

level_idc: An id of a lowest level that a decoder needs to satisfy. According to a proportion of the tile(s) to an area of a whole picture, a bit rate and a largest cache for decoding the tile(s) are calculated. For example, a bit rate is x and a largest cache is y for decoding the whole picture, and the proportion of the tile(s) to the area of the whole picture is r. Then the bit rate is x*r and the largest cache is y*r for the tile(s). A smallest level that meets this decoding performance is searched for according to profile_idc, and the bit rate x*r and the largest cache y*r for the tile(s), and level_idc is set to the foregoing smallest level.

A current tile id is set to k, where k=1.

Step S405: If k is s, that is, a current tile is the tile that covers the independently decodable view, step S406 is performed; otherwise, step S407 is performed.

Step S406: Set a tile(s) in an encoded picture that has the same packing type and flipping type as the current $i^{th}$ frame of picture to be a candidate inter-frame reference area of tile(s) in the current $i^{th}$ frame.

Step S407: Set all picture areas in a frame of encoded picture to be a candidate inter-frame reference area of a tile(k).

Step S408: Choose to use an intra-frame prediction or inter-frame prediction algorithm to encode the tile(k). When the inter-frame prediction algorithm is used for encoding, an optimal reference area is selected from the candidate inter-frame reference areas obtained in steps S406 and S407 to perform the encoding.

Step S409: If k is less than N, that is, the tile(k) is not a last tile in the to-be-encoded picture, where N is the total number of tiles in a frame of picture, then k=k+1, and the process is switched to step S405; if k is equal to N, the encoding ends.

According to the encoding method provided in the foregoing FIG. 10 and FIG. 11, an auxiliary message is added to an encoded bitstream and is carried in an SEI message, where Profile and Level information in the SEI message applies only to a sub-bitstream formed for an independently decodable area, which lowers a requirement for performance of a decoder. In addition, different candidate inter-frame reference areas are separately set for an independently decodable area tile and a non-independently decodable area tile in steps S406 and S407, which ensures that an encoding block in the area can be independently decoded and extends a reference range of an encoding block outside the area. Therefore, reference may be made to an encoding block that is similar to a current block in the encoding, thereby improving encoding efficiency and saving a transmission data volume.

FIG. 12 shows a video decoding method according to an embodiment of the present invention. In this embodiment, a decoder decodes a video bitstream that is encoded in the processes shown in FIG. 10 and FIG. 11, that is, a process of decoding a picture sequence whose length is M is as follows:

Step S501: Receive a to-be-decoded video bitstream, where the video bitstream includes several AUs, and each AU corresponds to a frame of encoded picture.

Step S502: Acquire one AU from the bitstream.

Step S503: Determine whether the current AU includes a picture in a frame packing arrangement, where a determining method is as follows: (1) the current AU includes an FPA (frame packing arrangement) message, and a cancellation flag bit in the message is 0; (2) the current AU does not include an FPA message, but a cancellation flag bit in a last FPA message previously received in the to-be-decoded video bitstream is 0. If either of the two conditions is met, step S504 is performed; otherwise, the process is switched to step S515.

Step S504: Determine whether the current AU includes an SEI message. If yes, step S506 is performed, otherwise, step S505 is performed.

Step S505: Determine whether a previously received AU includes the SEI message. If yes, a parameter in this message is reused to decode and output a picture in the current AU, and step S509 is performed; otherwise, step S515 is performed.

Step S506: Determine whether performance of the decoder meets a profile and level requirement in the SEI message. If no, decoding cannot be performed and directly ends; if yes, step S507 is performed.

Step S507: Initialize the decoder according to profile and level information in the SEI message.

Step S508: Acquire, from the foregoing SEI message, a tile id corresponding to an independently decodable area, where the tile id corresponding to the independently decodable area is s in this embodiment.

Step S509: Obtain picture information from the AU, where the picture information is encoded picture information and is to be decoded by the decoder.

Step S510: Obtain a picture in the tile(s) from the picture according to the tile id that is acquired from the SEI message and corresponding to the independently decodable area.

Step S511: Decode the picture in the tile(s), where a decoding method is determined according to a corresponding encoding method in an encoding process.

Step S512: Crop the picture in the tile(s) according to cropping information in the foregoing SEI message. If cropping_enable_flag is false, the cropping is not required; otherwise, an area identified by pic_crop_left_offset, pic_crop_right_offset, pic_crop_top_offset, and pic_crop_bottom_offset, that is, an independently decodable view in the tile(s), is obtained from the tile(s).

Step S513: Output the independently decodable view in the independently decodable area.

Step S514: If the current AU is a last AU in the bitstream, the decoding ends; otherwise, step S512 is performed.

Step S515: Perform a normal decoding process.

According to the decoding method provided in this embodiment, when a decoder receives a 3D video bitstream that is encoded by using a frame packing 3DTV technology, but the decoder is connected to a 2D display device, the decoder may obtain, according to an SEI message, only one of two views to perform decoding, that is, the decoding is performed only on an independently decodable area, which lowers a requirement for performance of the decoder and saves calculation and storage resources of the decoder. In addition, a profile and a level corresponding to a sub-bitstream of an independently encodable area generally lower a requirement for performance and storage of the decoder. Therefore, after the decoder is initialized, decoding time and electric power consumption of the decoder can be reduced and the requirement for the storage of the decoder is reduced. If the decoder does not meet a profile and level requirement of the original 3D video bitstream, but the decoder meets a profile and level requirement corresponding to the sub-bitstream of the independently encodable area, then support of the decoder for the 3D video bitstream that has a high requirement for a resolution or bit rate and is compatible with 2D display is increased.

Figure 13:
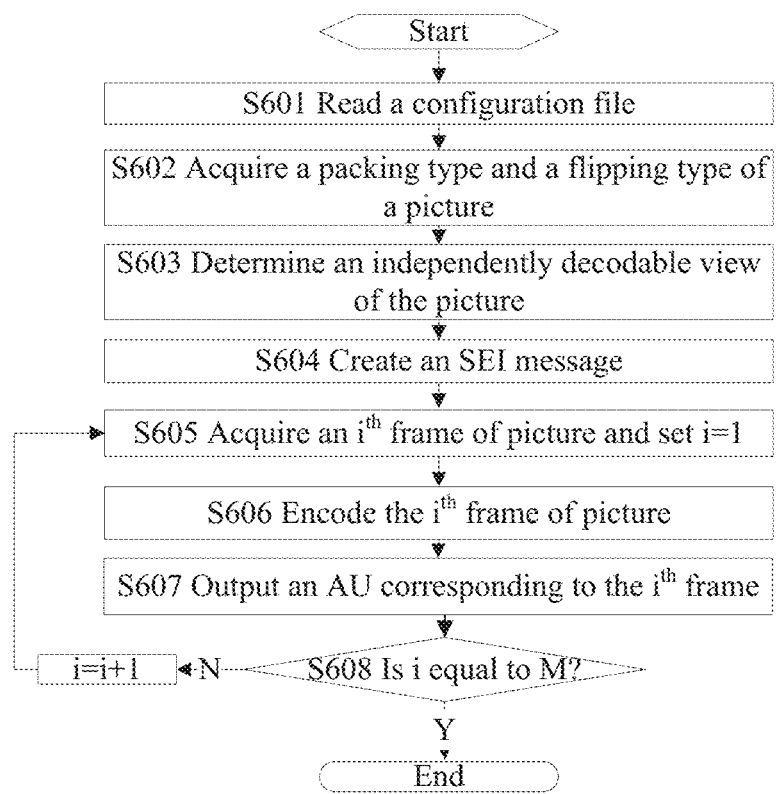
FIG. 13 is a flowchart of yet another video encoding method according to an implementation manner of the present invention.

FIG. 13 shows another video encoding method according to an embodiment of the present invention. In this embodiment, the foregoing auxiliary message is also carried in an SEI message, but this SEI message is different from the SEI message in FIG. 10, FIG. 11 and FIG. 12. A SEI message includes different independently decodable area identifiers, cropping information, profile and level information that are corresponding to pictures of various packing types and flipping types. A view that is of each frame of picture in a 3D video bitstream and finally displayed by a 2D display device is an independently decodable view. An area that covers the independently decodable view is represented by a rectangle area formed by multiple tiles, and each tile needs to meet a requirement of LCU alignment, where the rectangle area formed by the multiple tiles is an independently decodable area. A to-be-encoded video, that is, a to-be-encoded picture sequence, may include pictures that have different packing types and different flipping types.

The encoding method shown in FIG. 13 is a process of encoding a video by an encoder, where the video is a picture sequence whose length is M. A two-view arranging form is used as an example for each frame of picture, and one view thereof is a part that is finally displayed by the 2D display device, that is, the foregoing independently decodable view. For a person skilled in the art, an encoding method of a picture packed by two or more views may be obtained by simply transforming this method.

Step S601: Read a configuration file of the to-be-encoded video, where the configuration file stores an input parameter that needs to be predetermined in an encoding process of the encoder, such as a coding tool, a coding limitation, a property of a to-be-encoded picture. In this embodiment, an independently decodable view corresponding to a picture of each packing type and flipping type in the whole picture sequence is preset in the configuration file, such as a left view or a right view in a frame of picture. Independently decodable views corresponding to pictures of a same packing type and flipping type are the same, and independently decodable views corresponding to pictures of different packing types and flipping types are different.

Step S602: Acquire a combination of a packing type and a flipping type of each frame of picture in the picture sequence according to the configuration file of the to-be-encoded video.

Step S603: Determine an independently decodable view of each frame of picture in the picture sequence according to the independently decodable view that is preset in the configuration file and corresponding to the picture of each packing type and flipping type and according to information, which is acquired according to the configuration file, about the packing type and flipping type of each frame of picture.

Step S604: Create an SEI message, where the SEI message is sent only once in one picture sequence, and the SEI message includes different independently decodable area identifiers, cropping information, profile and level information that are corresponding to the pictures of various packing types and flipping types.

Each field of the SEI message is set, where the SEI message is defined in the following table. According to a combination, which is acquired from the configuration file, of the packing type and flipping type of the picture sequence, fields arrange_leftright_noflip, arrange_leftrightflip, arrange_topdown_no_flip and arrangefopdown_flip that are in the beginning of the SEI are set, and then the location identifier information, the cropping information, and the profile and level information that are of the independently decodable areas and corresponding to the pictures of different packing types and flipping types are separately set. For example, when arrange_leftright_no_flip is 1, a parameter corresponding to a picture that is left-right packed and does not have a flipping type is stored in if (arrange_leftright_no_flip) { . . . }, and the parameter in this area is always used when the picture that is left-right packed and does not have a flipping type is decoded. Another combination case of packing and flipping is similar to this case.

|  | Descriptor |
|---|---|
| INDEC_RGN_SEI(payloadSize){ |  |
| arrange_leftright_no_flip | u(1) |
| arrange_leftright_flip | u(1) |
| arrange_topdown_no_flip | u(1) |
| arrange_topdown_flip | u(1) |
| if (arrange_leftright_no_flip) { |  |
| tile_num | ue(v) |
| for (i=0; i<tile_num; i++) { |  |
| tile_ids[i] | ue(v) |
| } |  |
| cropping_enable_flag | u(1) |
| if (cropping_enable_flag) { |  |
| pic_crop_left_offset | ue(v) |
| pic_crop_right_offset | ue(v) |
| pic_crop_top_offset | ue(v) |
| pic_crop_bottom_offset | ue(v) |
| } |  |
| profile_idc | ue(v) |
| level_idc | ue(v) |
| } |  |
| if (arrange_leftright_flip) { |  |
| tile_num | ue(v) |
| for (i=0;i<tile_num;i++) { |  |
| tile_ids[i] | ue(v) |
| } |  |

|  | Descriptor |
|---|---|
| cropping_enable_flag | u(1) |
| if (cropping_enable_flag) { |  |
| pic_crop_left_offset | ue(v) |
| pic_crop_right_offset | ue(v) |
| pic_crop_top_offset | ue(v) |
| pic_crop_bottom_offset | ue(v) |
| } |  |
| profile_idc | ue(v) |
| level_idc | ue(v) |
| } |  |
| if (arrange_topdown_no_flip) { |  |
| tile_num | ue(v) |
| for (i=0; i<tile_num; i++){ |  |
| tile_ids[i] | ue(v) |
| } |  |
| cropping_enable_flag | u(1) |
| if (cropping_enable_flag) { |  |
| pic_crop_left_offset | ue(v) |
| pic_crop_right_offset | ue(v) |
| pic_crop_top_offset | ue(v) |
| pic_crop_bottom_offset | ue(v) |
| } |  |
| profile_idc | ue(v) |
| level_idc | ue(v) |
| } |  |
| if (arrange_topdown_flip) { |  |
| tile_num | ue(v) |
| for (i=0; i<tile_num; i++){ |  |
| tile_ids[i] | ue(v) |
| } |  |
| cropping_enable_flag | u(1) |
| if (cropping_enable_flag) { |  |
| pic_crop_left_offset | ue(v) |
| pic_crop_right_offset | ue(v) |
| pic_crop_top_offset | ue(v) |
| pic_crop_bottom_offset | ue(v) |
| } |  |
| profile_idc | ue(v) |
| level_idc | ue(v) |
| } |  |

The ue(v) in the table indicates that a length of the field is variable, u(n) indicates that the length of the field is n bits (bit), and u(1) identifies that the length of the field is 1 bit.

arrange_leftright_no_flip: A picture is left-right packed without left-right view flipping.

arrange_leftright_flip: A picture is left-right packed with left-right view flipping.

arrange_topdown_no_flip: A picture is top-bottom packed without left-right view flipping.

arrange_topdown_flip: A picture is top-bottom packed with left-right view flipping.

The location identifier information of the independently decodable area:

tile_num: The number of tiles included in the area that covers the independently decodable view.

tile_ids: An id array of the tiles included in the area that covers the independently decodable view, which indicates an id set corresponding to several tiles that cover the independently decodable area.

The following is the cropping information of the independently decodable area:

cropping_enable_flag: If a width of the independently decodable view is equal to a width of the independently decodable area, and a height of the independently decodable view is equal to a height of the independently decodable area, cropping_enable_flag is set to false; otherwise, cropping_enable_flag is set to true.

pic_crop_left_offset: Includes a horizontal coordinate of a left edge of the independently decodable view relative to the several tiles that cover the independently decodable view, and a pixel is used as a unit.

pic_crop_right_offset: Includes a horizontal coordinate of a right edge of the independently decodable view relative to the several tiles that cover the independently decodable view, and a pixel is used as a unit.

pic_crop_top_offset: Includes a vertical coordinate of a top edge of the independently decodable view relative to the several tiles that cover the independently decodable view, and a pixel is used as a unit.

pic_crop_bottom_offset: Includes a vertical coordinate of a bottom edge of the independently decodable view relative to the several tiles that cover the independently decodable view, and a pixel is used as a unit.

The following is profile and level information of a sub-bitstream of the independently decodable area:

profile_idc: A profile id that a coding tool set in the independently decodable area meets.

level_idc: An id of a lowest level that a decoder needs to satisfy. According to a proportion of the independently decodable area to an area of a whole picture, a bit rate and a largest cache for decoding the independently decodable area are calculated. For example, a bit rate is x and a largest cache is y for decoding the whole picture, and the proportion of the independently decodable area to the area of the whole picture is r. Then the bit rate is x*r and the largest cache is y*r for the independently decodable area. A smallest level that meets this decoding performance is searched for according to profile_idc, and the bit rate x*r and the largest cache y*r for the independently decodable area, and level_idc is set to the foregoing smallest level.

Step S605: Acquire an $i^{th}$ frame of picture and set i=1.

Step S606: encode the $i^{th}$ frame of picture, where a specific encoding process is described in detail in the following FIG. 14.

Step S607: Output an AU corresponding to an $i^{th}$ frame of currently encoded picture and save the AU in a storage apparatus of the encoder or an external storage apparatus, such as a video memory 101 of a source apparatus 100 or a buffer 1021 of an encoder 102, or directly transmit the AU to a remote receiving apparatus 200 by using a network.

Step S608: If i is equal to M (that is, the $i^{th}$ frame is a last frame), encoding ends; otherwise, i=i+1, and step S605 is performed.

Figure 14:
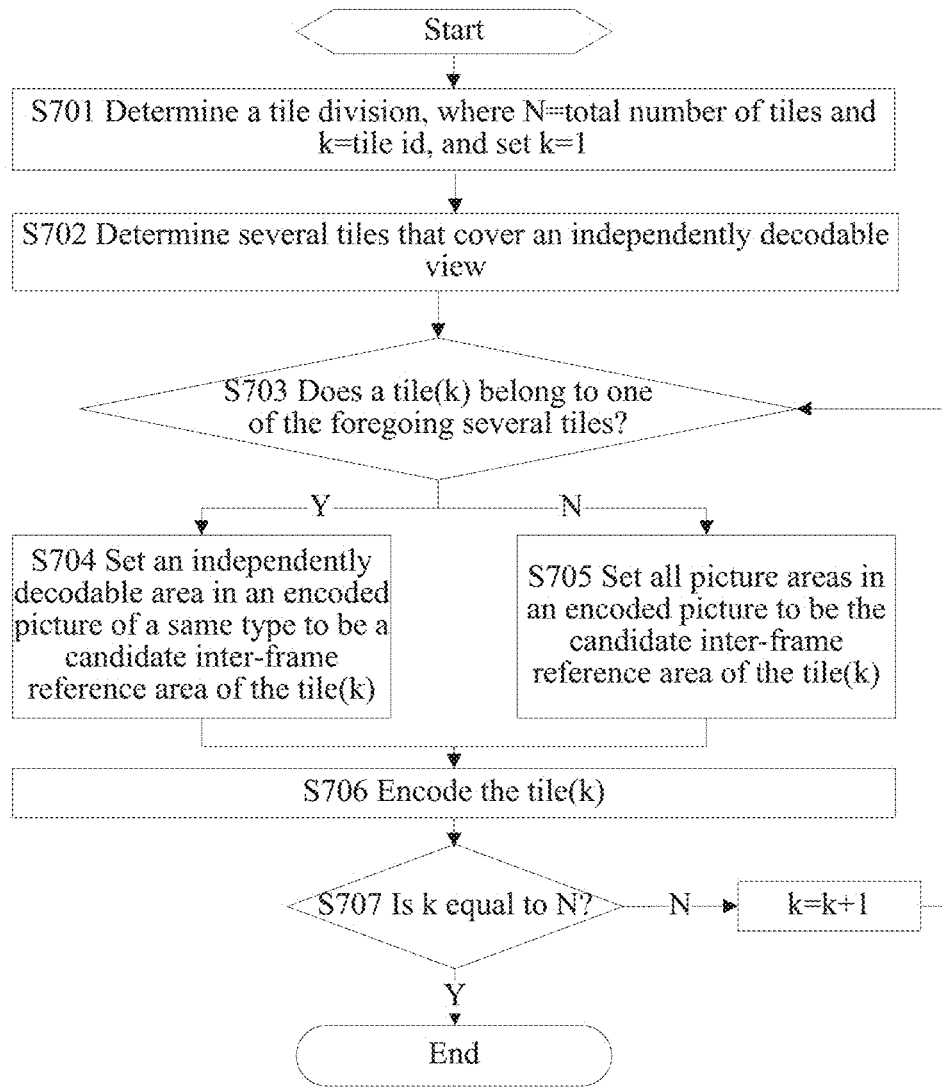
FIG. 14 is a flowchart of a specific method for encoding a frame of picture in the method process shown in FIG. 13.

FIG. 14 is a schematic flowchart of a specific method for encoding a frame of picture in step S606 in the video encoding method shown in FIG. 13.

Step S701: Determine a tile division solution and divide a picture according to the configuration file of the to-be-encoded video. A tile id is allocated first in a left-to-right sequence and then in a top-to-bottom sequence. For frame pictures of a same packing type and a same flipping type, the tile division is the same. A current tile id is set to k, where k=1, and the total number of tiles is N.

Step S702: Determine, according to the independently decodable view that is determined in step S603 and is of the picture of a different packing type and flipping type in the picture sequence, a set of several tiles that cover the independently decodable view, where each tile needs to meet a requirement of LCU alignment. An area corresponding to the several tiles that cover the independently decodable view is the independently decodable area. Accordingly, a tile_num field in the SEI message is set according to the number of tiles that cover the independently decodable area; a tile_ids field is set according to the id set of the tiles that cover the independently decodable area, where the field is an id array of the several tiles. After the LCU alignment is performed, a field corresponding to the cropping information in the SEI message is set according to the corresponding cropping information.

Step S703: Determine, according to step S702, whether a current tile(k) belongs to one of the several tiles that cover the independently decodable view. If the tile(k) belongs to one of the several tiles that cover the independently decodable view, step S704 is performed; otherwise, step S705 is performed.

Step S704: If the tile(k) belongs to one of the several tiles that cover the independently decodable view, set an independently decodable area in a previously encoded picture of a same packing type and flipping type to be a candidate inter-frame reference area of tile(k) in the current picture.

Step S705: If the tile(k) does not belong to one of the several tiles that cover the independently decodable view, set all picture areas in a previously encoded picture to be the candidate inter-frame reference area of tile(k) in the current picture.

Step S706: Choose to use an intra-frame prediction or inter-frame prediction algorithm to encode the tile(k). When the inter-frame prediction algorithm is used for encoding, an optimal reference area is selected from the candidate inter-frame reference areas in steps S704 and S705.

Step S707: If k is less than N, that is, the tile(k) is not a last tile in a to-be-encoded picture, then k=k+1, and step S703 is performed; if k is equal to N, the encoding ends.

According to the encoding method provided in the foregoing FIG. 13 and FIG. 14, an auxiliary message is added to an encoded bitstream and is carried in an SEI message, where Profile and Level information in the SEI message applies only to a sub-bitstream formed for an independently decodable area, which lowers a requirement for performance of a decoder. In addition, different candidate inter-frame reference areas are separately set for an independently decodable area tile and a non-independently decodable area tile in steps S704 and S705, which ensures that an encoding block in the area can be independently decoded and extends a reference range of an encoding block outside the area. Therefore, reference may be made to an encoding block that is similar to a current block in the encoding, thereby improving encoding efficiency and saving a transmission data volume.

FIG. 15 shows a video decoding method according to an embodiment of the present invention. In this embodiment, a decoder decodes a video bitstream that is encoded in the processes shown in FIG. 13 and FIG. 14, that is, a process of decoding a picture sequence whose length is M is as follows:

Step S801: Receive a to-be-decoded video bitstream, where the video bitstream includes several AUs, and each AU corresponds to a frame of encoded picture.

Step S802: Acquire one AU from the video bitstream.

Step S803: Determine whether the current AU includes a picture in a frame packing arrangement, where a determining method is as follows: (1) the current AU includes an FPA (frame packing arrangement) message, and a cancellation flag bit in the message is 0; (2) the current AU does not include an FPA message, but a cancellation flag bit in a last FPA message previously received in the to-be-decoded video bitstream is 0. If either of the two conditions is met, step S804 is performed; otherwise, step S815 is performed.

Step S804: Determine whether the current AU includes an SEI message or a previous bitstream has already received an SEI message. If yes, the process proceeds to step S805; otherwise, the process is switched to step S816.

Step S805: Obtain encoded picture information from the current AU.

Step S806: Determine, according to the FPA message, whether a packing type and a flipping type of a current $i^{th}$ frame of picture are the same as those of a previous frame of picture. If yes, step S811 is performed, otherwise, step S807 is performed.

Step S807: Find, according to the packing type and flipping type of the current frame, a parameter corresponding to these types in the SEI message, and obtain identifier information, cropping information, and profile and level information that are of an independently decodable area and corresponding to these types.

Step S808: Determine whether performance of the decoder meets a profile and a level in the SEI message. If no, decoding cannot be performed and the process directly ends; if yes, step S809 is performed.

Step S809: Initialize the decoder according the profile and level information in the SEI message.

Step S810: Acquire, from the foregoing SEI message, an id set of several tiles that are corresponding to an independently decodable area.

Step S811: Obtain, according to the foregoing tile id set, the several tiles that cover the independently decodable area.

Step S812: Decode a picture in the several tiles that cover the independently decodable area, where a decoding method is determined according to a corresponding encoding method in an encoding process.

Step S813: Crop the picture in the several tiles according to the cropping information in the foregoing SEI message. If cropping_enable_flag is false, the cropping is not required; otherwise, an area identified by pic_crop_left_offset, pic_crop_right_offset, pic_crop_top_offset, and pic_crop_bottom_offset, that is, an independently decodable view in the several tiles, is obtained from the several tiles.

Step S814: Output the independently decodable view to the display device 201 shown in FIG. 4, or if outputting time is not reached, temporarily save the independently decodable view in the buffer 2021 shown in FIG. 5.

Step S815: If the current AU is a last AU in the bitstream, the decoding ends; otherwise, step S802 is performed.

Step S816: Perform a normal decoding process.

According to the decoding method provided in this embodiment, when a decoder receives a 3D video bitstream that is encoded by using a frame packing 3DTV technology, but the decoder is connected to a 2D display device, the decoder may obtain, according to an SEI message, only one of two views to perform decoding, that is, the decoding is performed only on an independently decodable area, which lowers a requirement for performance of the decoder and saves calculation and storage resources of the decoder. Referring to step S809, a profile and a level corresponding to a sub-bitstream of an independently encodable area generally lower a requirement for performance and storage of the decoder. Therefore, after the decoder is initialized, decoding time and electric power consumption of the decoder can be reduced and the requirement for the storage of the decoder is reduced. If the decoder does not meet a profile and level requirement of the original 3D video bitstream, but the decoder meets a profile and level requirement corresponding to the sub-bitstream of the independently encodable area, then support of the decoder for the 3D video bitstream that has a high requirement for a resolution or bit rate and is compatible with 2D display is increased.

Figure 16:
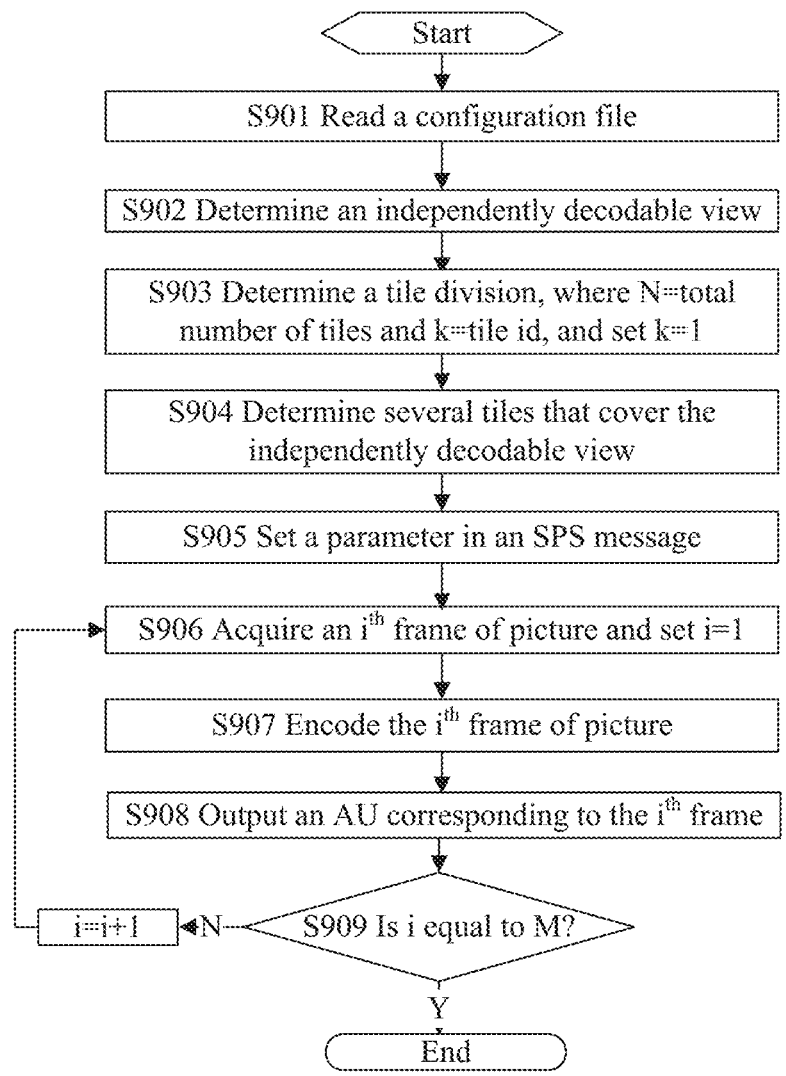
FIG. 16 is a flowchart of still another video encoding method according to an implementation manner of the present invention.

FIG. 16 shows a video encoding method according to an embodiment of the present invention. In this embodiment, the foregoing auxiliary message is carried in an SPS message. The SPS message may include an independently decodable area identifier and may also include location identifier information of an independently decodable area, cropping information, and profile and level information. The independently decodable area corresponds to a rectangle area formed by one or more independent tiles. An area outside the independently decodable area corresponds to a rectangle area formed by one or more dependent tiles. In this embodiment, a to-be-encoded video, that is, a to-be-encoded picture sequence, has a same packing type and flipping type. If the picture sequence has different packing types and flipping types, an encoding process of the picture sequence is similar to step S403 and step S404 shown in FIG. 11, a decoding process of the picture sequence is similar to step S807 shown in FIG. 15, and a difference is that the auxiliary message is respectively carried in the SEI message and the SPS message.

The encoding method shown in FIG. 16 is a process of encoding a video by an encoder, where the video is a picture sequence whose length is M. A two-view packing arrangement is used as an example for each frame of picture, and one view thereof is a part that is finally displayed by a 2D display device, that is, the foregoing independently decodable area. For a person skilled in the art, an encoding method of a picture packed by two or more views may be obtained by simply transforming this method.

Step S901: Read a configuration file of the to-be-encoded video, where the configuration file stores an input parameter that needs to be predetermined in an encoding process of the encoder, such as a coding tool, a coding limitation, and a property of a to-be-encoded picture. In this embodiment, an independently decodable view of each frame of picture is preset in the configuration file. Because the picture sequence in this embodiment has the same packing type and flipping type, the independently decodable view of each frame of picture is the same.

Step S902: Determine the independently decodable view of each frame of picture in the picture sequence according to the configuration file, such as a left view or a right view in a frame of picture, and set a current frame to be an $i^{th}$ frame, where i=1.

Step S903: Determine a tile division solution and divide a picture according to the configuration file. A tile id is allocated first in a left-to-right sequence and then in a top-to-bottom sequence. For frame pictures of a same packing type and a same flipping type, the tile division is the same. A current tile id is set to k, where k=1, and the total number of tiles is N.

Step S904: Determine, according to the independently decodable view that is determined in step S902 and is of each frame of picture, a set of several tiles that cover the independently decodable view, and define a tile in this set to be an independent tile, and a tile outside this set to be a dependent tile, where the several tiles that cover the independently decodable view need to meet a requirement that top, bottom, left and right borders of the several tiles are aligned with an LCU.

Step S905: Set a parameter in the SPS message and set each field in the SPS message according to the identifier information, the cropping information, and the profile and level information that are of the independently decodable area, where the SPS message is defined in the following table.

| | Descriptor |
|---|---|
| profile_tier_level(ProfilePresentFlag, MaxNumSubLayersMinus1) { | |
| if(ProfilePresentFlag) { | |
| ...... | |
| } | |
| general_level_idc | u(8) |
| indec_rgn_present_flag | u(1) |
| if (indec_rgn_present_flag) { | |
| tile_num | ue(v) |
| for (i=0; i<tile_num; i++){ | |
| tile_ids[i] | ue(v) |
| } | |
| cropping_enable_flag | u(1) |
| new_profile_flag | u(1) |
| new_level_flag | u(1) |
| if (cropping_enable_flag) { | |
| pic_crop_left_offset | ue(v) |
| pic_crop_right_offset | ue(v) |
| pic_crop_top_offset | ue(v) |
| pic_crop_bottom_offset | ue(v) |
| } | |
| } | |
| if(new_profile_flag){ | |
| profile_idc | ue(v) |
| } | |
| if(new_level_flag){ | |
| level_idc | ue(v) |
| } | |
| for(i = 0; i < MaxNumSubLayersMinus1; i++) { | |
| ...... | |
| } | |
| } | |

The ue(v) in the table indicates that a length of the field is variable, u(n) indicates that the length of the field is n bits, and u(1) identifies that the length of the field is 1 bit.

The independently decodable area identifier:

indecrgn_present_flag: When the independently decodable view exists in the video, indecrgn_present_flag is set to true; otherwise, the indec_rgn_present_flag is set to false.

The location identifier information of the independently decodable area:

tile_num: The number of included tiles that cover the independently decodable view.

tile_ids: An id array of the included tiles that cover the independently decodable view, which indicates an id set corresponding to the several tiles that cover the independently decodable view.

The following is the cropping information of the independently decodable area:

cropping_enable_flag: If a width of the independently decodable view is equal to a total width of the several tiles that cover the independently decodable view, and a height of the independently decodable view is equal to a total height of the several tiles that cover the independently decodable view, cropping_enable_flag is set to false; otherwise, cropping_enable_flag is set to true.

pic_crop_left_offset: Includes a horizontal coordinate of a left edge of the independently decodable view relative to the several tiles that cover the independently decodable view, and a pixel is used as a unit.

pic_crop_right_offset: Includes a horizontal coordinate of a right edge of the independently decodable view relative to the several tiles that cover the independently decodable view, and a pixel is used as a unit.

pic_crop_top_offset: Includes a vertical coordinate of a top edge of the independently decodable view relative to the several tiles that cover the independently decodable view, and a pixel is used as a unit.

pic_crop_bottom_offset: Includes a vertical coordinate of a bottom edge of the independently decodable view relative to the several tiles that cover the independently decodable view, and a pixel is used as a unit.

The following is profile and level information of a sub-bitstream of the independently decodable area:

new_profile_flag: Indicates whether an identifier of a profile of the sub-bitstream of the independently decodable area is the same as an identifier of a profile of a whole bitstream. If a value of new_profile_flag is 0, it indicates that they are the same; if the value of new_profile_flag is 1, it indicates that they are different.

new_level_flag: Indicates whether an identifier of a level of the sub-bitstream of the independently decodable area is the same as an identifier of a level of a whole bitstream. If a value of new_level_flag is 0, it indicates that they are the same; if the value of new_level_flag is 1, it indicates that they are different.

profile_idc: A profile id that a coding tool set in the independently decodable area applies.

level_idc: An id of a lowest level that a decoder needs to satisfy. According to a proportion of the independently decodable area to an area of a whole picture, a bit rate and a largest cache for decoding the independently decodable area are calculated. For example, a bit rate is x and a largest cache is y for decoding the whole picture, and the proportion of the independently decodable area to the area of the whole picture is r. Then the bit rate is x*r and the largest cache is y*r for the independently decodable area. A smallest level that meets this decoding performance is searched for according to profile_idc, and the bit rate x*r and the largest cache y*r for the independently decodable area, and level_idc is set to the foregoing smallest level.

Step S906: Acquire an $i^{th}$ frame of picture and set i=1.

Step S907: Encode the $i^{th}$ frame of picture, where a specific encoding process is described in detail in the following FIG. 17.

Step S908: Output an AU corresponding to an $i^{th}$ frame of currently encoded picture and save the AU in a storage apparatus of the encoder or an external storage apparatus, such as a video memory 101 of a source apparatus 100 or a buffer 1021 of an encoder 102, or directly transmit the AU to a remote receiving apparatus 200 by using a network.

Step S908: If i is equal to M (the $i^{th}$ frame is a last frame), encoding ends; otherwise, i=i+1, and step S906 is performed.

Figure 17:
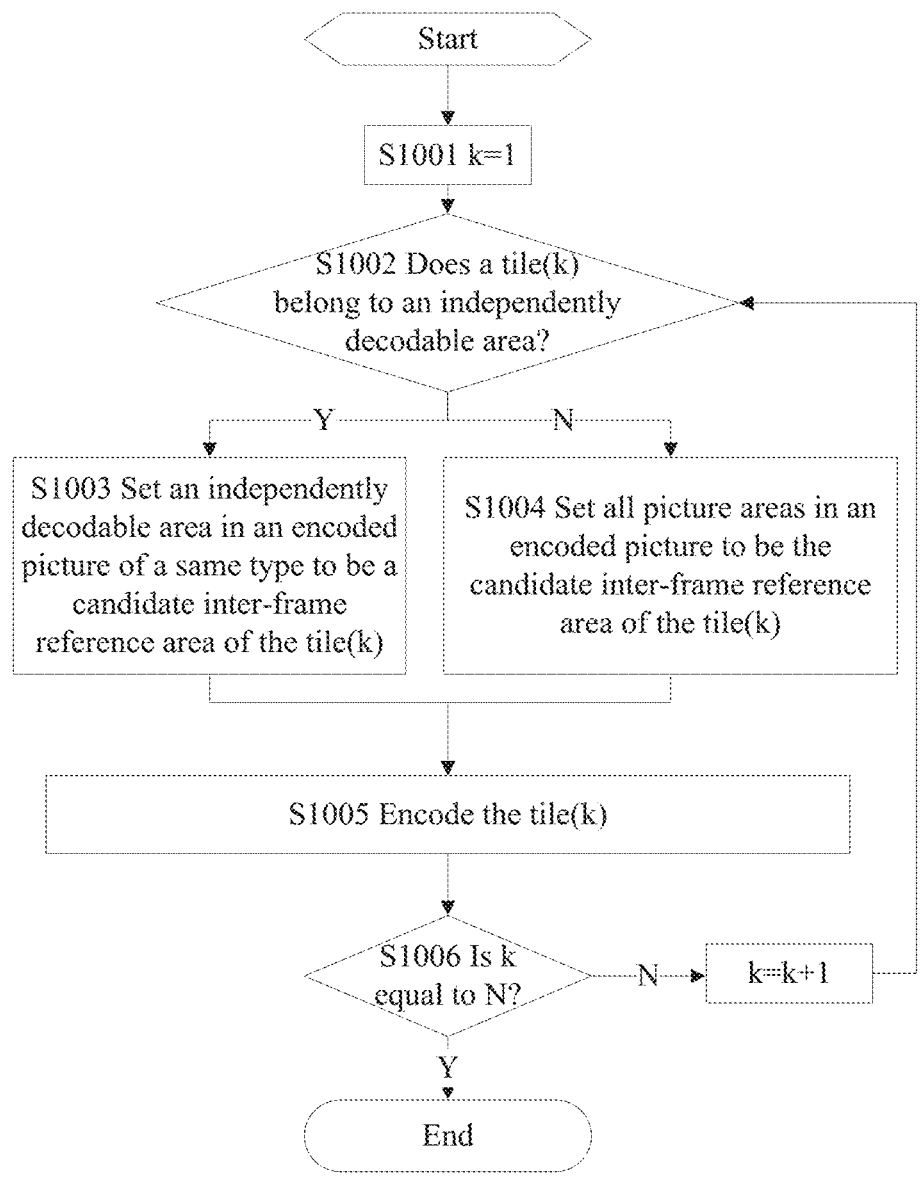
FIG. 17 is a flowchart of a specific method for encoding a frame of picture in the method process shown in FIG. 16.

FIG. 17 is a schematic flowchart of a specific method for encoding a frame of picture in step S907 in the video encoding method shown in FIG. 16.

Step S1001: A tile id is k and set k=1.

Step S1002: Determine, according to content of the tile_ids field in the SPS message, whether a current tile(k) belongs to one of the several tiles that cover the independently decodable view. If the tile(k) belongs to one of the several tiles that cover the independently decodable view, step S1003 is performed; otherwise, step S1004 is performed.

Step S1003: If the tile(k) belongs to one of the several tiles that cover the independently decodable view, set an independently decodable area in a previously encoded frame picture of a same packing type and flipping type to be a candidate inter-frame reference area of the current frame picture tile(k).

Step S1004: If the tile(k) does not belong to one of the several tiles that cover the independently decodable view, set all picture areas in a previously encoded frame picture to be the candidate inter-frame reference area of the current frame picture tile(k).

Step S1005: Choose to use an intra-frame prediction or inter-frame prediction algorithm to encode the tile(k). When the inter-frame prediction algorithm is used for encoding, an optimal reference area is selected from the candidate inter-frame reference areas in steps S1003 and S1004. When the intra-frame prediction algorithm is used for encoding, if the tile(k) does not belong to one of the several tiles that cover the independently decodable area, that is, the tile(k) is a dependent tile, the tile(k) may use a picture block of an adjacent independent tile as a candidate range for selecting an optimal reference block.

Step S1006: If k is less than N, that is, the tile(k) is not a last tile in a to-be-encoded picture, then k=k+1, and step S1002 is performed; if k is equal to N, the encoding ends.

According to the encoding method provided in the foregoing FIG. 16 and FIG. 17, a new field is added to an existing SPS message in an encoded bitstream to identify information related to an independently decodable area, so as to implement a function of an auxiliary message. Profile and Level information in an SEI message applies only to a sub-bitstream formed for the independently decodable area, which lowers a requirement for performance of a decoder. In addition, different candidate inter-frame reference areas are separately set for an independently decodable area tile and a non-independently decodable area tile in steps S1003 and S1004, which ensures that an encoding block in an area can be independently decoded and extends a reference range of an encoding block outside the area. Therefore, reference may be made to an encoding block that is similar to a current block in the encoding, thereby improving encoding efficiency and saving a transmission data volume.

FIG. 18 shows a video decoding method according to an embodiment of the present invention. In this embodiment, a decoder decodes a video bitstream that is encoded in the processes shown in FIG. 16 and FIG. 17, that is, a process of decoding a picture sequence whose length is M is as follows:

Step S1101: Receive a to-be-decode video bitstream, where the video bitstream includes several AUs, and each AU corresponds to a frame of encoded picture.

Step S1102: Acquire an SPS message from the video bitstream, and determine whether an indec_rgnpresent_flag field in the SPS message is true. If yes, it is set to continue the decoding; otherwise, step S1114 is performed.

Step S1103: Acquire profile and level information from the SPS message in the video bitstream, and determine whether performance of the decoder meets a profile and a level in the SPS message. If no, the decoding cannot be performed and the process directly ends; if yes, step S1104 is performed.

Step S1104: Initialize the decoder according to the foregoing profile and level information.

Step S1105: Acquire, from the SPS message, a corresponding id set of tiles that cover an independently decodable view.

Step S1106: Acquire one AU from the video bitstream.

Step S1107: Determine whether the current AU includes a picture in a frame packing arrangement, where a condition and method of the determining is as follows: (1) the current AU includes an FPA (frame packing arrangement) message, and a cancellation flag bit in the message is 0; (2) the current AU does not include an FPA message, but a cancellation flag bit in a last FPA message previously received in the bitstream is 0. If either of the two conditions is met, the process proceeds to a next step; otherwise, the process is switched to step S1114.

Step S1108: Obtain encoded picture information from the current AU.

Step S1109: Obtain, according to the corresponding id set that is obtained in step S1105 and is of the tiles that cover the independently decodable view, several tiles that cover the independently decodable view.

Step S1110: Decode a picture in the several tiles that cover the independently decodable view, where a decoding method is determined according to a corresponding encoding method in an encoding process.

Step S1111: Crop the picture in the several tiles according to cropping information in the foregoing SPS message. If cropping_enable_flag is false, the cropping is not required; otherwise, an area identified by pic_crop_left_offset, pic_crop_right_offset, pic_crop_top_offset, and pic_crop_bottom_offset, that is, the independently decodable view in the several tiles, is obtained from the several tiles.

Step S1112: Output the independently decodable view to the display device 201 shown in FIG. 4, or if outputting time is not reached, temporarily save the independently decodable view in the buffer 2021 shown in FIG. 5.

Step S1113: If the current AU is a last AU in the bitstream, the decoding ends; otherwise, step S1106 is performed.

Step S1114: Perform a normal decoding process.

According to the decoding method provided in this embodiment, when a decoder receives a 3D video bitstream that is encoded by using a frame packing 3DTV technology, but the decoder is connected to a 2D display device, the decoder may obtain, according to an SEI message, only one of two views to perform decoding, that is, the decoding is performed only on an independently decodable area, which lowers a requirement for performance of the decoder and saves calculation and storage resources of the decoder. Referring to step S1104, a profile and a level of corresponding to a sub-bitstream of an independently encodable area generally lower a requirement for performance and storage of the decoder. Therefore, after the decoder is initialized, decoding time and electric power consumption of the decoder can be reduced and the requirement for the storage of the decoder is reduced. If the decoder does not meet a profile and level requirement of the original 3D video bitstream, but the decoder meets a profile and level requirement corresponding to the sub-bitstream of the independently encodable area, then support of the decoder for the 3D video bitstream that has a high requirement for a resolution or bit rate and is compatible with 2D display is increased.

A person of ordinary skill in the art may understand that the video coding and decoding method shown in the foregoing embodiments may be implemented by hardware related to a program instruction. The program may be stored in a computer readable storage medium. When the program runs, the corresponding steps of the foregoing method are performed. The storage medium may be such as a ROM/RAM, a magnetic disk, or an optical disc.

The foregoing descriptions are merely exemplary implementation manners of the present invention. It should be noted that a person of ordinary skill in the art may make several improvements or polishing without departing from the principle of the present invention and the improvements or polishing shall fall within the protection scope of the present invention.

What is claimed is:

1. A video decoding method, comprising:
receiving, by a decoder, a video bitstream, wherein the video bitstream comprises a to-be-decoded video and supplemental enhancement information (SEI), wherein the to-be-decoded video comprises a to-be-decoded picture sequence;
acquiring, by the decoder, a to-be-decoded picture from the to-be-decoded picture sequence and an auxiliary message corresponding to the to-be-decoded picture, wherein the auxiliary message is comprised in the SEI and comprises level information defined for an independently decodable area of the to-be-decoded picture;
determining, by the decoder, performance of the decoder meets a performance requirement according to the level information defined for the independently decodable area of the to-be-decoded picture;
by the decoder, a location identifier of the independently decodable area of the to-be-decoded picture according to the auxiliary message, wherein the location identifier of the independently decodable area comprises tile identifiers of one or more tiles; and
decoding, by the decoder, the independently decodable area of the to-be-decoded picture according to the location identifier of the independently decodable area comprised in the auxiliary message.

2. The method according to claim 1, wherein the auxiliary message further comprises an independently decodable area identifier, and the independently decodable area identifier is used to identify whether the to-be-decoded picture comprises the independently decodable area.

3. The method according to claim 1, wherein the auxiliary message further comprises cropping information used for decoding the independently decodable area, and the cropping information comprises a horizontal coordinate or a vertical coordinate of a top, bottom, left or right border of an independently decodable view relative to the independently decodable area;
wherein the method further comprises:
cropping the independently decodable area according to the cropping information in the auxiliary message to obtain the independently decodable view.

4. The method according to claim 1, wherein the auxiliary message further comprises profile information used for decoding the independently decodable area, and the profile information is used to identify a coding tool set in the independently decodable area.

5. The method according to claim 1, wherein the to-be-decoded picture sequence comprises pictures of different packing types and flipping types;
wherein the auxiliary message further comprises location identifiers, which are corresponding to the pictures of different packing types and flipping types, of independently decodable areas.

6. The method according to claim 5, wherein the auxiliary message further comprises at least one of cropping information, profile information and level information that is corresponding to the pictures of different packing types and flipping types and used for decoding the independently decodable areas.

7. A decoder, comprising:
one or more processors; and
one or more memories, wherein one or more programs are stored in the one or more memories, and in addition, the one or more programs are configured to be executed by the one or more processors, and the one or more programs comprise:
an instruction, configured to receive a video bitstream, wherein the video bitstream comprises a to-be-decoded video and supplemental enhancement information (SEI), wherein the to-be-decoded video comprises a to-be-decoded picture sequence;
an instruction, configured to acquire a to-be-decoded picture from the to-be-decoded picture sequence and an auxiliary message corresponding to the to-be-decoded picture, wherein the auxiliary message is comprised in the SEI and comprises level information defined for an independently decodable area of the to-be-decoded picture;
an instruction, configured to determine performance of the decoder meets a performance requirement according to the level information defined for the independently decodable area of the to-be-decoded picture;
an instruction, configured to obtain a location identifier of the independently decodable area of the to-be-decoded picture according to the auxiliary message, wherein the location identifier of the independently decodable area comprises tile identifiers of one or more tiles; and
an instruction, configured to decode the independently decodable area of the to-be-decoded picture according to the location identifier of the independently decodable area comprised in the auxiliary message.

8. The decoder according to claim 7, wherein the auxiliary message further comprises one piece of the following information: an independently decodable area identifier, cropping information used for decoding the independently decodable area, and profile information used for decoding the independently decodable area.

9. A decoder, disposed in a receiving apparatus for processing a video, comprising:
one or more circuits, configured to:
receive a video bitstream, wherein the video bitstream comprises a to-be-decoded video and supplemental enhancement information (SEI), wherein the to-be-decoded video comprises a to-be-decoded picture sequence;
acquire a to-be-decoded picture from the to-be-decoded picture sequence and an auxiliary message corresponding to the to-be-decoded picture, wherein the auxiliary message is comprised in the SEI and comprises level information defined for an independently decodable area of the to-be-decoded picture;
determining, by the decoder, performance of the decoder meets a performance requirement according to the level information defined for the independently decodable area of the to-be-decoded picture;
obtain a location identifier of the independently decodable area of the to-be-decoded picture according to the auxiliary message, wherein the location identifier of the independently decodable area comprises tile identifiers of one or more tiles; and
decode the independently decodable area of the to-be-decoded picture according to the location identifier of the independently decodable area comprised in the auxiliary message.

10. A non-transitory computer-readable storage medium, wherein the computer-readable storage medium stores several instructions, and when the several instructions are executed by a device, the device is triggered to perform the following operations:

- receiving a video bitstream, wherein the video bitstream comprises a to-be-decoded video and supplemental enhancement information (SEI), wherein the to-be-decoded video comprises a to-be-decoded picture sequence;
- acquiring a to-be-decoded picture from the to-be-decoded picture sequence and an auxiliary message corresponding to the to-be-decoded picture, wherein the auxiliary message is comprised in the SEI and comprises level information defined for an independently decodable area of the to-be-decoded picture;
- determining, by the decoder, performance of the decoder meets a performance requirement according to the level information defined for the independently decodable area of the to-be-decoded picture;
- obtaining a location identifier of the independently decodable area of the to-be-decoded picture according to the auxiliary message, wherein the location identifier of the independently decodable area comprises tile identifiers (tile id) of one or more tiles; and
- decoding the independently decodable area of the to-be-decoded picture according to the location identifier of the independently decodable area comprised in the auxiliary message.

* * * * *